(12) United States Patent
Petrick

(10) Patent No.: US 9,986,471 B2
(45) Date of Patent: May 29, 2018

(54) WIRELESS MESH NETWORK REPAIR SYSTEM

(71) Applicant: Dell Products L.P., Round Rock, TX (US)

(72) Inventor: Christopher Stephen Petrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 14/943,833

(22) Filed: Nov. 17, 2015

(65) Prior Publication Data

US 2017/0142619 A1 May 18, 2017

(51) Int. Cl.
*H04W 36/00* (2009.01)
*H04W 36/06* (2009.01)
*H04L 12/703* (2013.01)
*H04W 84/18* (2009.01)

(52) U.S. Cl.
CPC ......... *H04W 36/0055* (2013.01); *H04L 45/28* (2013.01); *H04W 36/06* (2013.01); *H04W 84/18* (2013.01)

(58) Field of Classification Search
CPC ............. H04W 36/0055; H04W 36/06; H04W 76/023; H04W 84/18
See application file for complete search history.

(56) References Cited

U.S. PATENT DOCUMENTS

| 7,388,827 | B2 | 6/2008 | Kaspit et al. |
| 7,720,499 | B2 | 5/2010 | Srikrishna et al. |
| 8,045,463 | B2 | 10/2011 | Radunovic et al. |
| 8,274,928 | B2 | 9/2012 | Dykema et al. |

(Continued)

OTHER PUBLICATIONS

M. Ersue, Ed., Nokia Networks, D. Romascanu, Avaya, J. Schoenwaelder, Jacobs University Bremen, U. Herberg, "Management of Networks With Constrained Devices: Problem Statement and Requirements draft-ietf-opsawg-coman-probstate-regs-05," Mar. 1, 2015, pp. 1-46; Internet Engineering Task Force; https://tools.ietf.org/html/draft-ietf-opsawg-coman-probstate-regs-05.

(Continued)

*Primary Examiner* — Luat Phung
(74) *Attorney, Agent, or Firm* — Haynes and Boone, LLP

(57) ABSTRACT

A wireless mesh network repair system includes a first wireless communication device that is configured to provide a first wireless communication path that provides for the transmission of wireless communications between first and second devices and to provide a notification of a change in the first wireless communication path that will prevent the transmission of the wireless communications between the first and second devices on the first wireless communication path. The system further includes at least one second wireless communication device that is configured to receive the notification from the first wireless communication device, and in response, determine a second wireless communication path that will provide for the transmission of wireless communications between the first and second devices, adjust a second wireless communication device communication range, and provide for the transmission of wireless communication signals between the first and second devices on the second wireless communication path.

20 Claims, 18 Drawing Sheets

(56) References Cited

U.S. PATENT DOCUMENTS

| | | | |
|---|---|---|---|
| 8,768,265 B2 | 7/2014 | Folden et al. | |
| 2004/0218548 A1* | 11/2004 | Kennedy | H04L 1/1685 370/254 |
| 2005/0163137 A1* | 7/2005 | Wakumoto | H04L 45/02 370/406 |
| 2007/0153677 A1* | 7/2007 | McLaughlin | H04L 45/00 370/216 |
| 2010/0214979 A1* | 8/2010 | Kuehnel | H04L 41/00 370/328 |
| 2012/0040662 A1* | 2/2012 | Rahman | H04W 36/0055 455/423 |
| 2012/0011923 A1 | 5/2012 | Van Wyk et al. | |
| 2014/0126356 A1 | 5/2014 | Lee et al. | |
| 2014/0192723 A1 | 7/2014 | Schenk et al. | |
| 2014/0253093 A1 | 9/2014 | Bermudez Rodriguez et al. | |

OTHER PUBLICATIONS

Ryan Detwiller, "CloudTraz Help Center: Part 3: Placing Nodes and Scaling the Network—CloudTrax," Sep. 15, 2015, pp. 1-8; https://help.cloudtrax.com/hc/en-us/articles/202405770-Part-3-Placing-Nodes.

Greg Ferro, "Network Dictionary—dying gasp—EnterealMind," May 20, 2010, pp. 1-5, http://ethereaimind.com/network-diction-ary-dying-gasp/.

Krishna Paul and S. Bandyopadhyay, "Self-Adjusting Transmission Range Control of Mobile Hosts in Ad Hoc Wireless Networks for Stable Communication," 8 Pages, Cognizant Technology Solutions, Sector V. Saltlake, Calcutta 700 091 India.

Kaabneh et al, "Sustanable Practices: Concepts, Methodologies, Tools and Applications, LBPC Scheme," 2009, pp. 436-437 and p. 440, Halasa, https://books.google.com/books?id=siBHAgAAQBAJ&pg=PA436&lpg=PA436&dq=mesh+node+transmission+range+adjustment&source=bl&ots=GkbmfNfLZ8&sig=3Z6z1BPFIfUasRay5-oMuGn8Bkc&hl=en&sa=X&ei=pjhfVZn4KYOqsAXAyYG4Dw&ved=0CDcQ6AEwAw#v=onepage&q=mesh%20node%20transmission%20range%20adjustment&f=false.

* cited by examiner

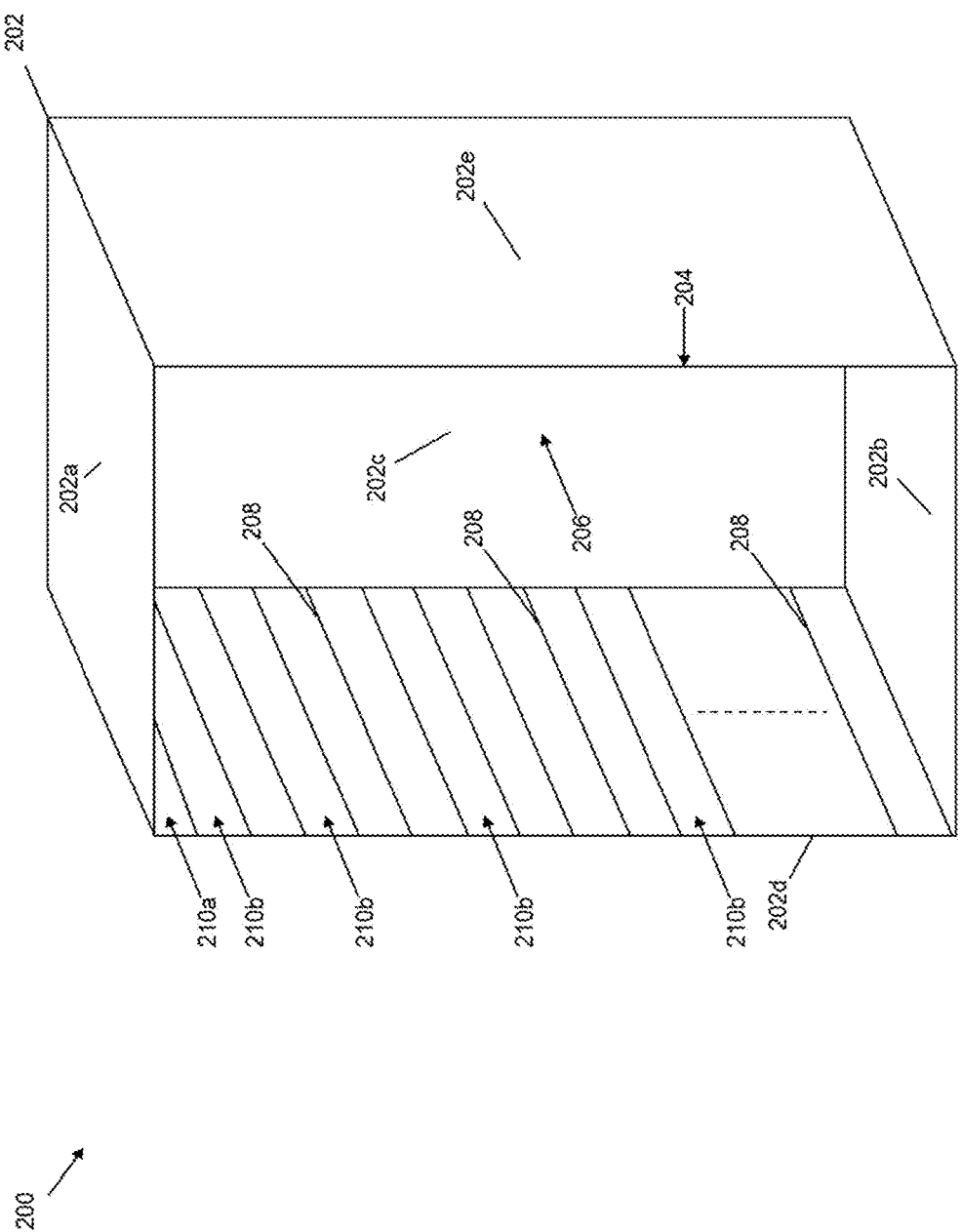

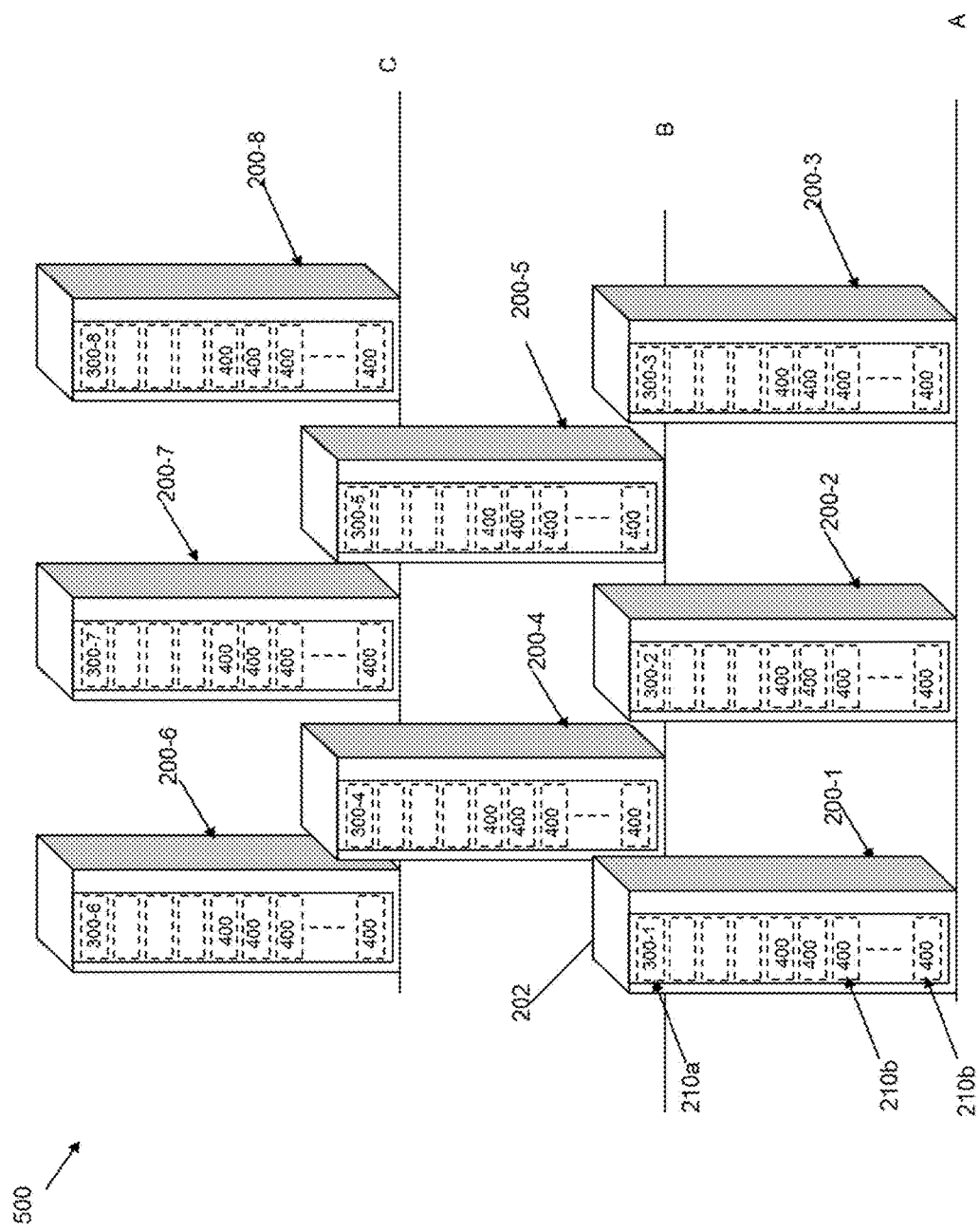

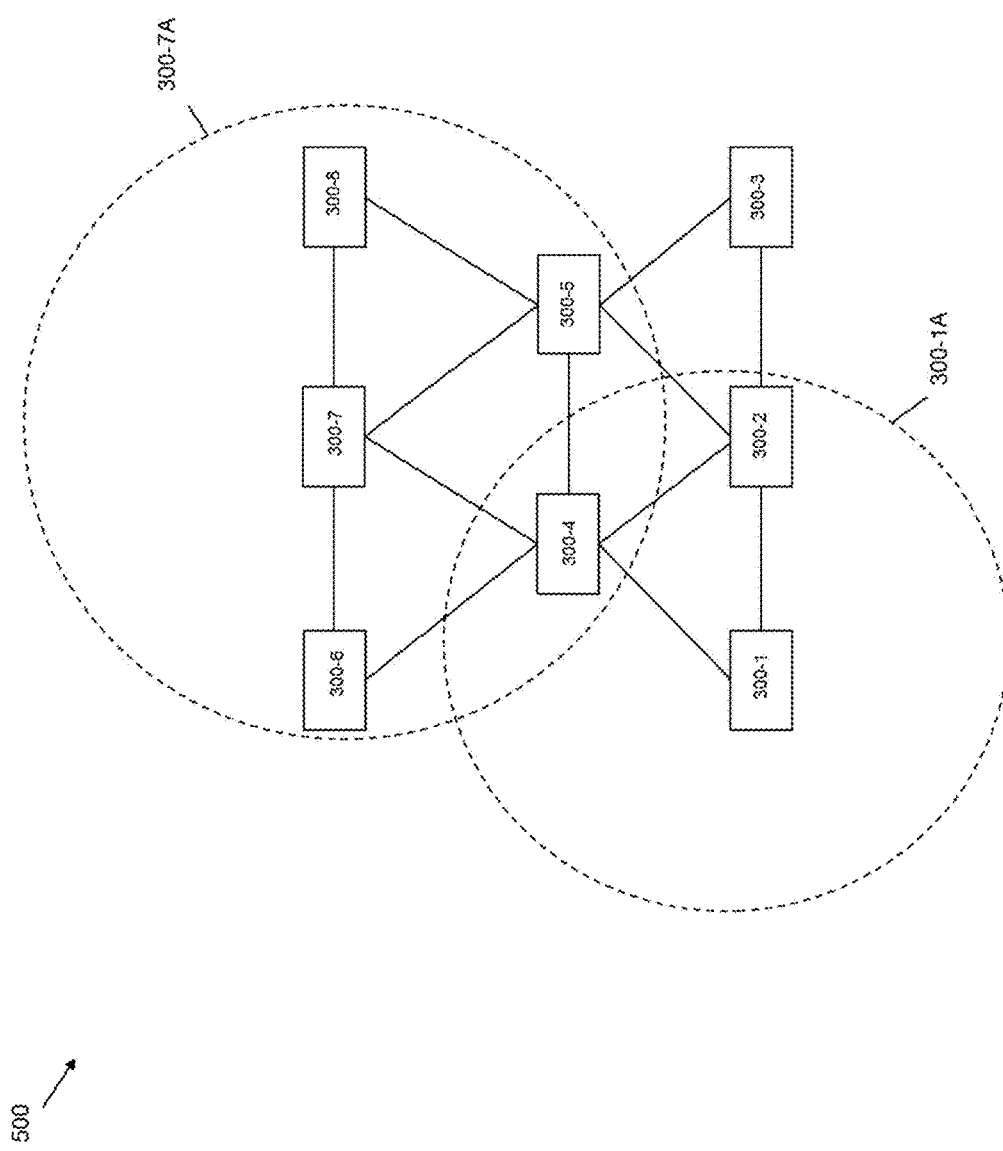

FIG. 8C

| CHANGING NODE ID 852 | CHANGE NOTIFICATION MESSAGE 850 | | | |
|---|---|---|---|---|
| | NODE INFORMATION 854 | | POSSIBLE PATH INFORMATION 856 | |
| | NODE ID | COMMUNICATION PROPERTIES | ORIGINAL PATH | POSSIBLE PATH(S) |
| NODE 706 | NODE 702 | C1 | PATH 726 | PATH 808, PATH 810 |
| | NODE 708 | C2 | PATH 728 | PATH 812 |
| | NODE 710 | C3 | | |
| | NODE 712 | C4 | | |
| | NODE 714 | C5 | | |

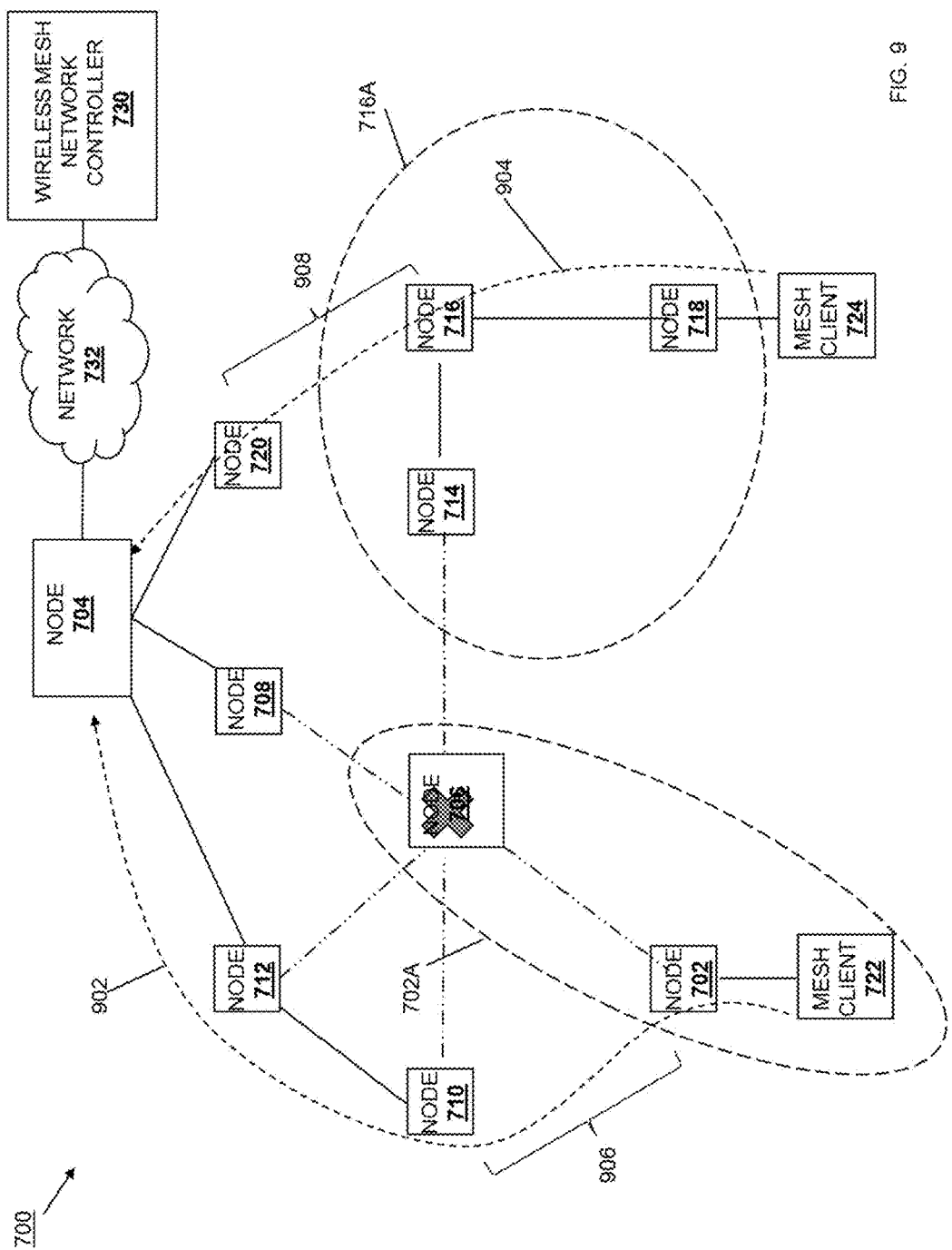

WIRELESS MESH NETWORK REPAIR SYSTEM

BACKGROUND

The present disclosure relates generally to information handling systems, and more particularly to a wireless mesh network repair system for information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, cell phones, laptops, servers, chassis controller cards and line cards in a chassis system, and storage devices, may communicate with other devices using a wireless mesh network. For example, in a particular chassis system, a chassis card (e.g., a line card, a chassis controller card) located in the chassis system may wirelessly communicate to other chassis cards located in the same chassis system, where each of the chassis cards in the particular chassis system may function as a wireless mesh access node (also referred to as node herein) of a wireless mesh network. For further example, in any particular rack of a datacenter, a plurality of servers may be connected to a Top Of Rack (TOR) switch which may function as a wireless mesh access node of a wireless mesh network. TOR switches in a plurality of racks of the datacenter may wirelessly communicate with each other to form the wireless mesh network. A message may be communicated between the servers (also referred to as mesh clients herein) and/or between a server and other networked devices wirelessly along a path of nodes by hopping from node to node until the message reaches its destination. In conventional systems, a particular node typically polls the wireless mesh network periodically, and when it discovers a change (e.g., another node in the path is no longer operating to transmit messages through the wireless mesh network), that particular node may update wireless transmission paths to provide for communications between source nodes and the destination nodes in the wireless mesh network. The use of polling in updating wireless transmission paths raises a number of issues. For example, the particular node may discover the change in available nodes and/or paths by polling well after that change has occurred, which can result in packet losses and/or communication delays prior to discovery of the change.

Accordingly, it would be desirable to provide a wireless mesh network repair system.

SUMMARY

According to one embodiment, an information handling system (IHS) includes a wireless communication subsystem; a processing system that is coupled to the wireless communication subsystem; and a memory system that is coupled to the processing system and that includes instructions that, when executed by the processing system, cause the processing system to provide a wireless mesh network repair engine that is configured to: receive a notification of a change in a first wireless communication path that will prevent the transmission of the wireless communications between a first device and a second device on the first wireless communication path and, in response, determine a second wireless communication path that will provide for the transmission of wireless communications between the first device and the second device; adjust a second wireless communication device communication range to provide the second wireless communication path; and provide for the transmission of wireless communication signals between the first device and the second device on the second wireless communication path.

BRIEF DESCRIPTION OF THE DRAWINGS

FIG. 2 is a perspective view illustrating an embodiment of a rack.

FIG. 5A is a perspective view illustrating an embodiment of a wireless mesh network.

FIG. 5B is a schematic view illustrating an embodiment of the wireless mesh network of FIG. 5A.

FIG. 8C is a table illustrating an embodiment of a change notification message used in the method of FIG. 6

FIG. 9 is a schematic view illustrating an embodiment of communications between networking devices in a wireless mesh network operating according to the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
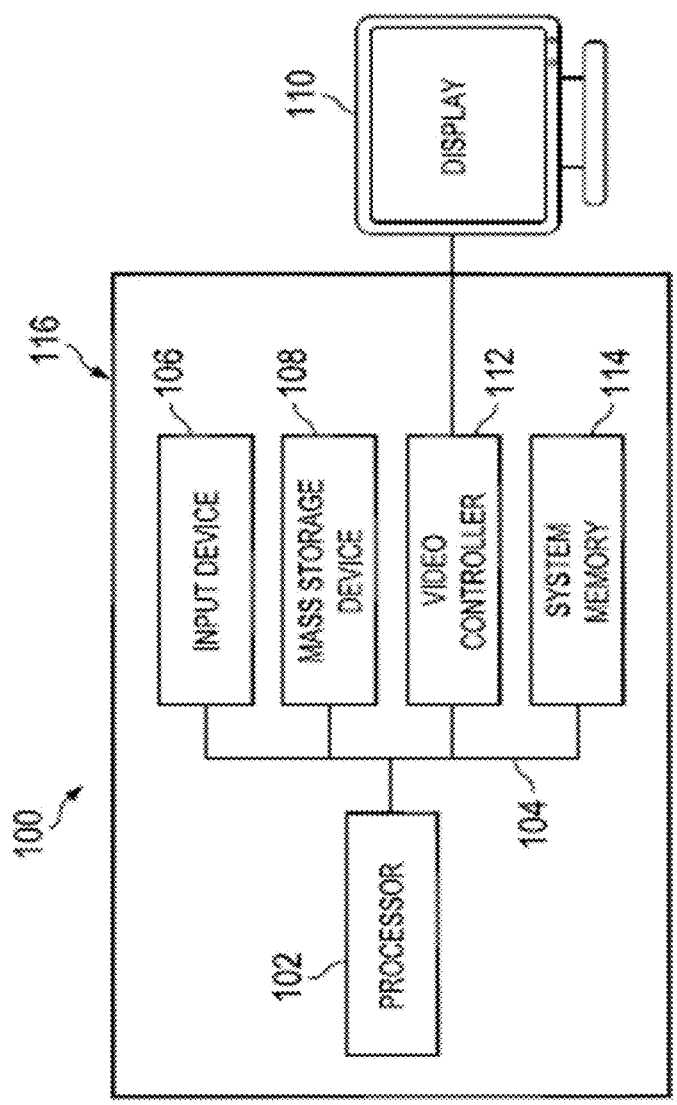
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a rack 200 is illustrated. The rack 200 is illustrated and described below as a conventional datacenter rack that houses a plurality of server devices and a networking device (e.g., a TOR switch) in a vertical (e.g., one-on-top-of-the-other) orientation. However, one of skill in the art in possession of the present disclosure will recognize that the teachings of the present disclosure may be applied to different types of racks used in different situations (e.g., other than datacenters) and that house other types of devices (e.g., storage devices) in any of a variety of orientations (e.g., a horizontal/side-by-side orientation). The rack 200 includes a rack base 202 having a top wall 202a, a bottom wall 202b that is located opposite the rack base 202 from the top wall 202a, a rear wall 202c that extends between the top wall 202a and the bottom wall 202b, and a pair of side walls 202d and 202e that are located on opposite sides of the rack base 202 and that extend between the top wall 202a, the bottom wall 202b, and the rear wall 202c. While illustrated and described as "walls" for clarity, one of skill in the art in possession of the present disclosure will recognize that any or all of the top wall 202a, the bottom wall 202b, the rear wall 202c, and the side walls 202d and 202e may instead include framing, define channels, holes, or other apertures, and/or may otherwise include different structures that provide the rack 200 while remaining within the scope of the present disclosure. The edges of the top wall 202a, the bottom wall 202b, and the side walls 202d and 202e that are opposite the rear wall 202c define a rack entrance 204 that provides access to a rack housing 206 that is defined between the top wall 202a, the bottom wall 202b, the rear wall 202c, and the side walls 202d and 202e. In the embodiment of FIG. 2, the rack entrance 204 is illustrated as open and allowing access to the rack housing 206. However, in other embodiments, the rack 200 may include a door that is configured to close over the rack entrance 204 and control access to the rack housing 206 (e.g., in a cooled rack). As such, in some embodiments the rack entrance 204 may provide a design limit with regard to devices positioned in the rack housing 206 (e.g., such that they may not extend past the rack housing 204), while in other embodiments, the rack entrance 204 may not introduce such design limits (or at least allow for the extension of devices past the rack housing 204).

As illustrated, the side wall 202d may include a plurality of device coupling features 208 that define a first device housing 210a and a plurality of second device housings 210b. While not illustrated, the side wall 202e may include similar device coupling features that operate to define the first device housing 210a and the second device housings 210b. In the embodiments discussed below, the first device housing 210a is described as being utilized in coupling a networking device to the rack 200, while the second device housings 210b are described as being utilized in coupling server devices to the rack 200. However, one of skill in the art in possession of the present disclosure will recognize that the first device housing 210a and the second device housings 210b may be substantially similar, and may be used to couple any of a variety of different devices to the rack 200. In specific embodiments discussed below, the rack 200 is described as a conventional 19-inch rack that is configured to house devices having widths of approximately 19 inches (e.g., as measured between the side walls 202d and 202e of the rack 200), and that includes a height of 42 rack units (42 U) such that the rack 200 may include a networking device in the first device housing 210a and forty server devices in the second device housings 210b. However, the teachings of the present disclosure are not intended to be limited to this specific embodiment, and one of skill in the art will recognize that those teachings may be applied to "half-height" racks, horizontal racks, and/or other racks known in the art while remaining within the scope of the present disclosure.

Figure 3A:
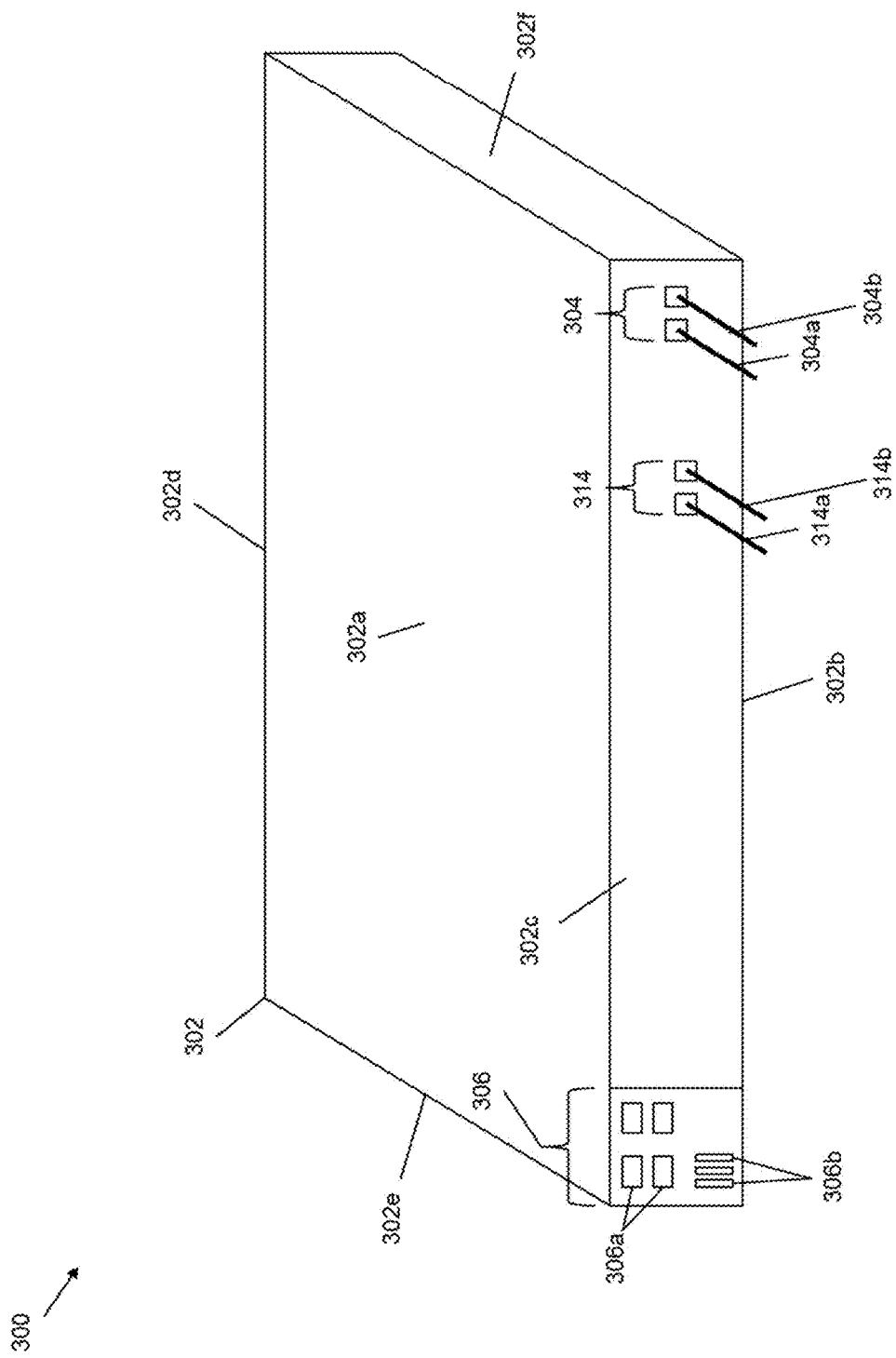
FIG. 3A is a perspective view illustrating an embodiment of a networking device.
Figure 3B:
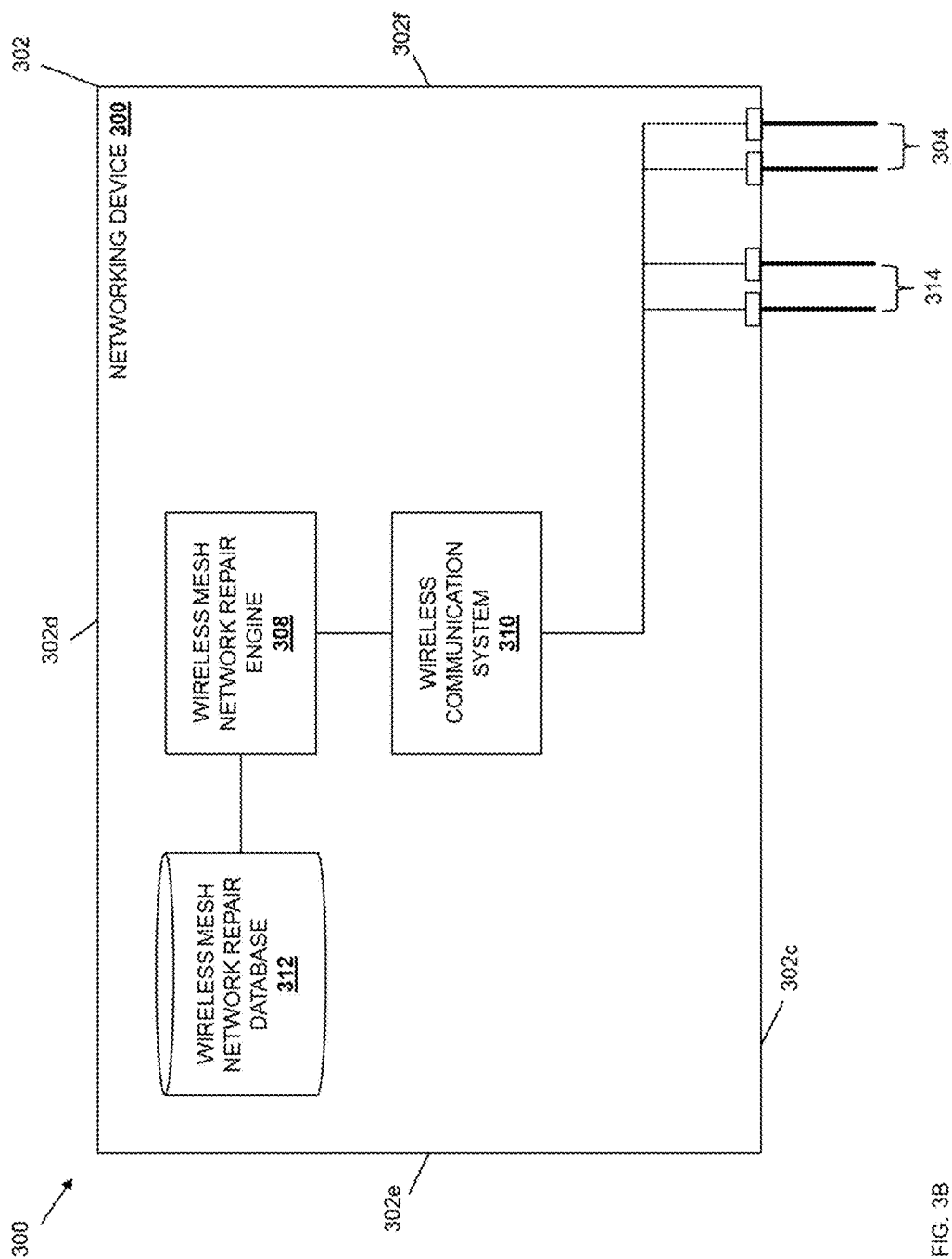
FIG. 3B is a schematic view illustrating an embodiment of the networking device of FIG. 3A.

Referring now to FIGS. 3A and 3B, an embodiment of a networking device 300 is illustrated. The networking device 300 may be the IHS 100 discussed above with reference to FIG. 1 and/or may include some or all of the components of the IHS 100. In a specific embodiment, the networking device 300 may be a Top Of Rack (TOR) switch. However, in other embodiments, the networking device 300 may be other types of switches (e.g., a Fibre Channel switch for a Storage Area Network (SAN), a Universal Serial Bus (USB) based switch, a Peripheral Component Interconnect express (PCIe) based switch) and/or other types of rack devices while remaining within the scope of the present disclosure. The networking device 300 includes a chassis 302 having a top surface 302a, a bottom surface 302b that is located opposite the chassis 302 from the top surface 302a, a front surface 302c extending between the top surface 302a and the bottom surface 302b, a rear surface 302d located opposite the chassis 302 from the front surface 302c and extending between the top surface 302a and the bottom surface 302b, and a pair of side surfaces 302e and 302f located opposite the chassis 302 from each other and extending between the top surface 302a, the bottom surface 302b, the front surface 302c, and the rear surface 302d. While not illustrated, each of the side surfaces 302e and 302f (as well as other surfaces) on the networking device 300 may include rack engagement features for engaging the device coupling features 208 on the rack 200 to couple the networking device 300 to the rack 200.

In the embodiments discussed below, the front surface 302c of the networking device 300 includes two antenna systems 304 and 314 that extend from the front surface 302c. However, different numbers of antenna systems may be provided with the networking device 300 that operate in the manner discussed below for the antenna systems 304 and 314 while remaining within the scope of the present disclosure. In the illustrated embodiment, the antenna system 304 includes a pair of antennas (e.g., antennas 304a and 304b). However, different numbers of antennas (e.g., a single antenna, more than two antennas, etc.) will fall within the scope of the present disclosure. In a specific embodiment, the antennas in the antenna system 304 may be provided by transmitters and/or receivers (e.g., the antenna 304a in the antenna system 304 may be provided as a transmitter, while the antenna 304b in the antenna system 304 may be provided as a receiver). While each of the antennas 340a and 304b in the antenna system 304 are illustrated with straight lines, one of skill in the art in possession of the present disclosure will recognize that antenna(s) used in antenna systems may include a three-dimensional shape/configuration that provides a width and height (as well as the length that is illustrated). For example, the antennas 304a and 304b used for the antenna system 304 may include a width of approximately 5 millimeters and a height of approximately 1-2 millimeters. In some embodiments, the antennas 304a and 304b used for the antenna system 304 may reside inside and/or otherwise be housed in the chassis 302, and thus may not extend outwards from the surfaces (e.g., the top surface 302a, the bottom surface 302b, the front surface 302c, the rear surface 302d, and/or the side surfaces 302e and 302f) of the chassis 302.

In the embodiments discussed below, the antennas 304a and 304b in the antenna system 304 are an integrated component of the networking device 300 such that they are not configured to be removed from the front surface 302c of the chassis 302. However, in some embodiments, the antennas 304a and 304b for the antenna system 304 may be configured to be coupled to and decoupled from the networking device 300. For example, the antennas 304a and 304b for the antenna system 304 may be configured to couple to data communications ports (e.g., Ethernet ports, Fibre Channel ports, USB networked ports, PCIe networked ports, or other data communications ports known in the art) on the networking device 300 while remaining within the scope of the present disclosure. In some of those examples, the antennas 304a and 304b for the antenna system 304 may couple to conventional Ethernet ports on a structurally conventional networking device (that includes the wireless mesh network repair engines taught by the present disclosure) if the configuration of those Ethernet ports is sufficient to provide the wireless communication functionality discussed below. However, in other embodiments, the networking device 300 may be configured with Ethernet ports according to the teachings below in order to provide the wireless communication functionality discussed below. Thus, one of skill in the art in possession of the present disclosure will recognize that the provisioning of antennas on the networking device 300 to provide the wireless communication functionality discussed below will depend on the configuration of the system (i.e., the racks, other devices in the racks, etc.), and a wide variety of different antenna systems (integrated, port-coupled, combinations thereof, etc.) will fall within the scope of the present disclosure.

The antenna system 314 may include a pair of antennas 314a and 314b, and may be substantially similar to the antenna system 304. In some embodiments, the antenna systems 304 and 314 may operate in the same frequency, while in other embodiments, the antenna systems 304 and 314 may operate in different frequencies. In one example, the antenna system 304 may be connected to a first radio subsystem and configured to operate in a first frequency band (e.g., at 2.4 GHZ in accordance with IEEE specifications 802.11b, 802.11g, 802.11n, and/or other wireless specifications known in the art), and the antenna system 314 may be connected to a second radio and is configured to operate in a second frequency band (e.g., at 5 GHZ band in accordance with IEEE specifications 802.11a, 802.11n, at 60 GHz in accordance with 802.11ad, and/or according to other wireless specifications known in the art). In some embodiments, only one of the antenna systems 304 and 314 may be operated at a time, and the networking device 300 may operate in a single frequency band. In some embodiments, both of the antenna systems 304 and 314 may be operated at the same time, and the networking device 300 may operate in two frequency bands. In other embodiments, the networking device 300 may include additional antenna systems, and thus may operate in three or more different frequency bands.

The networking device 300 may also include a variety of other networking device features, only some of which are illustrated in FIGS. 3A and 3B. For example, a management port area 306 may be provided on the front surface 302c. In the illustrated embodiment, the management port area 306 includes a plurality of management Ethernet ports 306a and a plurality of management Universal Serial Bus (USB) ports 306b, but one of skill in the art in possession of the present disclosure will recognize that a variety of other management ports and/or management features may be provided in the management port area 306 while remaining within the scope of the present disclosure. Furthermore, the management port area 306 is provided at a location on the front surface 302c of the networking device 300 that is adjacent the side surface 302e based, at least on part, in the configuration of the rack 200 in order to provide the wireless communication paths (also referred to as path) discussed below, and the location of the management port area 306 may be moved based on different wireless mesh network configurations to provide different wireless communication paths as desired or required by the wireless mesh network configuration.

While not illustrated, one of skill in the art in possession of the present disclosure will recognize that a plurality of networking ports (e.g., Ethernet ports, switch uplink ports, etc.) may be provided on the front surface 302c of the networking device 300 between the antenna systems 304, 314 and the top surface 302a. Similarly as with the management port area 306, the networking ports may be provided on the front surface 302c of the networking device 300 based, at least on part, in the configuration of the rack 200 in order allow for the provision of the wireless communication paths discussed below, and the location of the networking ports may be moved based on different wireless mesh network configurations to provide different wireless communication paths as desired or required by the wireless mesh network configuration. In the specific embodiment illustrated in FIG. 3A, no ports or other obstructions are provided on the front surface 302c between the antenna systems 304, 314 and the bottom surface 302b of the chassis 302 in order to allow for the wireless communication paths discussed below. However, one of skill in the art in possession of the present disclosure will recognize how the networking device 300 may be modified to operate as discussed below when used with the rack in different configurations (e.g., by providing an unobstructed front surface 302c between the antenna systems 304 and the top surface 302a when the networking device 300 is positioned in the bottom of the rack 200).

Referring now to FIG. 3B, the chassis 302 of the networking device 300 may house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a wireless mesh network repair engine 308 that is configured to perform the functions of the wireless mesh network repair engines and networking devices discussed below. The wireless mesh network repair engine 308 is coupled to a wireless communication system 310 (e.g., via a coupling between the processing system and the wireless communication system 310) that is coupled to the antenna systems 304 and 314. In different embodiments, the wireless communication system 310 may include network interface controllers (NICs), BLUETOOTH® wireless communication subsystems, Wi-Fi wireless communications subsystems, and/or any of a variety of other wireless communication components known in the art. In some embodiments, the wireless mesh network repair engine 308 is also coupled to a storage device (not illustrated, but which may be the storage device 108, discussed above with reference to FIG. 1, that is coupled to the processing system) that includes a wireless mesh network repair database 312 that includes a variety of different information for providing for the wireless mesh network repair functionality discussed below. Furthermore, while not illustrated, the wireless mesh network repair engine 308 may include other subsystems such as, for example, location determination systems (e.g., a Global Positioning System (GPS)) and/or other subsystems that may be utilized as discussed below.

As discussed below, the wireless mesh network repair engine 308 may be configured to operate with the wireless communication system 310 to adjust a communication range of the networking device 300 by, for example, adjusting a wireless transmission power utilized by the wireless communication system 310, adjusting a wireless communication frequency channel utilized by the wireless communication system 310, adjusting a wireless communication direction (e.g., a beam form) provided by the wireless communication system 310 using the antenna systems 304 and/or 314, selecting a wireless communication protocol utilized by the wireless communication system 310, and/or other adjusting a variety of other wireless communication characteristics and/or properties known in the art. In some embodiments, the wireless mesh network repair engine 308 may utilize various transmission power control algorithms to preserve power while maintaining the connectivity of the wireless mesh network including, for example, a Local Mean Algorithm (LMA), a Local Minimum Spanning Tree (LMST), a Max-Min Power (MMP) algorithm, and any other transmission power control algorithm known in the art.

In some embodiments, the wireless mesh network repair engine 308 may be configured to change one or more communication frequencies that the wireless communication system 310 utilizes to wirelessly communicate. In one example, the wireless mesh network repair engine 308 is configured to activate the antenna system 304 while deactivating the antenna system 314, while the wireless communication system 310 is configured to operate in a single frequency band (e.g. at 2.4 GHz). In another example, the wireless mesh network repair engine 308 is configured to deactivate the antenna system 304 while activating the antenna system 314, and the wireless communication system 310 is configured to operate in another single frequency band (e.g., at 5 GHz or 60 GHz). In yet another example, the wireless mesh network repair engine 308 is configured to activate both the antenna systems 304 and 314, and the wireless communication system 310 is configured to operate in two frequency bands (e.g., at 2.4 GHz and/or 5 GHz and/or 60 GHz).

In some embodiments, the wireless mesh network repair engine 308 is configured to change communication directions through the antenna systems 304 and 314 by performing spatial filtering, beam forming, and/or other signal processing techniques that provide for directional signal transmission and/or reception. In some embodiments, the wireless mesh network repair engine 308 is configured to change the communication protocol utilized by the wireless communication system 310 between any of ultra-wideband (UWB) wireless communications, OFDM wireless communications, WirelessHART® wireless communications, ZigBee® wireless communications, Bluetooth® wireless communications, 6LoWPAN® wireless communications, Wi-Fi® wireless communications, or any other wireless communication protocols known in the art. However, one of skill in the art in possession of the present disclosure will recognize that other wireless communication protocols and wireless communication range adjustment techniques will fall within the scope of the present disclosure.

In some embodiments, as discussed below, the wireless mesh network repair engine 308 may be configured to detect or predict a change in wireless communication properties that may result from a reset, a power failure, a change in transmission power, a change in location, a change in communication frequency channel, a change in communication direction, a change in communication protocol, and/or other communication property changes known in the art) of the wireless communication system 310, and send a notification of the change using the antenna systems 304 and/or 314 to other nodes in the wireless mesh network. In some examples, the wireless mesh network repair engine 308 may be configured to utilize the information associated with the change in wireless communication properties to determine results and/or consequences of those changes that may include resulting gaps in wireless communication paths, as well as possible paths to repair those gaps, and may provide that information in the notification as well.

While in the embodiments discussed below, the networking device 300 is provided as a network repairing wireless communication device that performs the wireless mesh network repair of the present disclosure while positioned in a device housing in the rack 200, other network repairing wireless communication devices may be provided in place of the networking device 300 while remaining within the scope of the present disclosure. For example, devices such as beacon devices, wireless router devices, chassis controller cards or line cards of a chassis system, and/or other wireless communications devices that operate in a wireless mesh network may be enabled to perform network repairing and may be positioned at other locations while remaining within the scope of the present disclosure. As such, the network repairing wireless communication device(s) of the present disclosure may be positioned on the rack 200 (e.g., on the top surface 202a), adjacent the rack 200 (e.g., on a wall, ceiling, or floor adjacent the rack 200), in a location without using a rack 200, and/or in a variety of other locations that would allow for the wireless mesh network and wireless communication paths discussed below.

Figure 4:
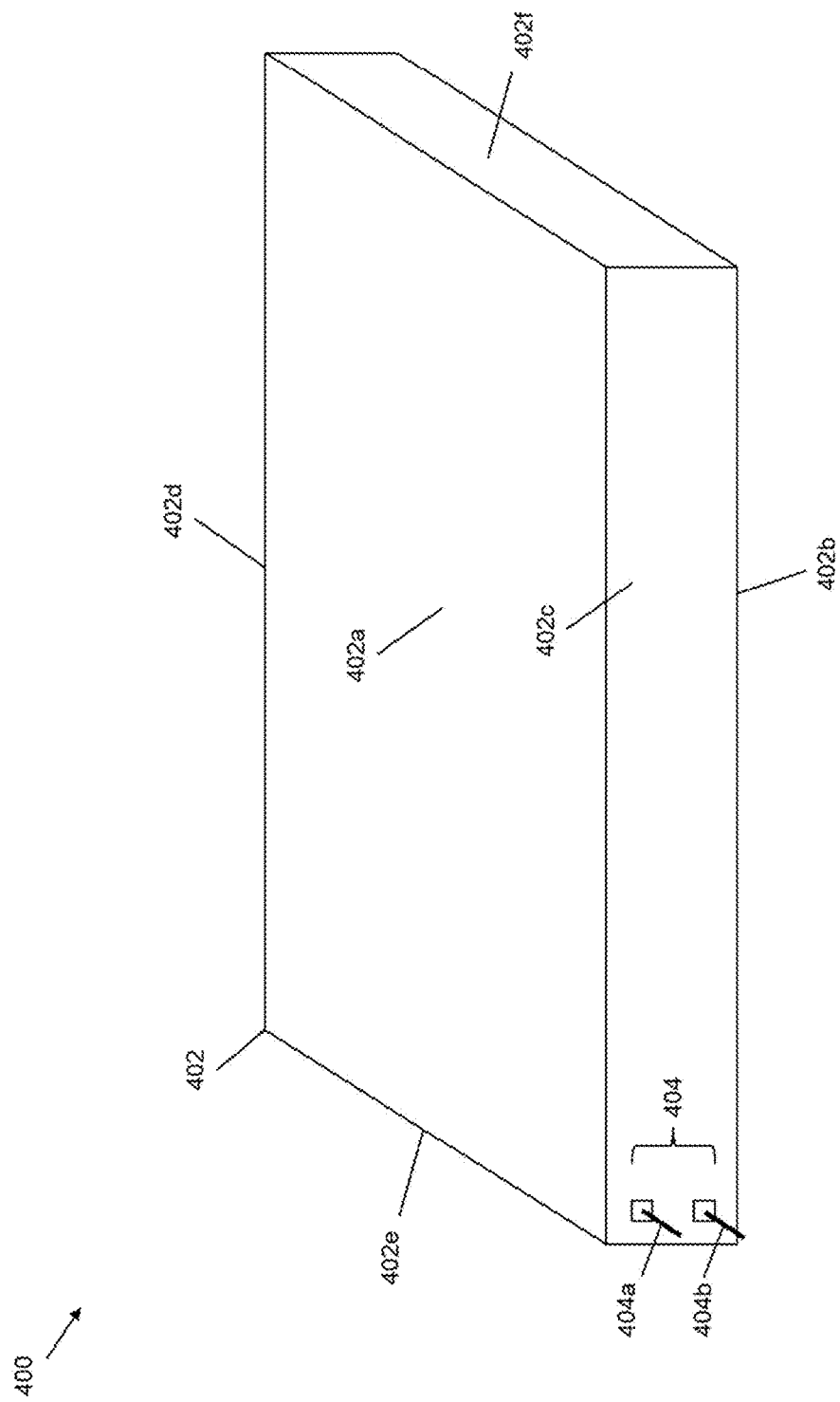
FIG. 4 is a perspective view illustrating an embodiment of a server device.

Referring now to FIG. 4, an embodiment of a server device 400 is illustrated. The server device 400 may be the IHS 100 discussed above with reference to FIG. 1 and/or may include some or all of the components of the IHS 100. In specific embodiments discussed below, the server device 400 is illustrated and described as a data center server that that functions as a mesh client device of the wireless mesh network discussed herein. However, in some embodiments the mesh client device of the present disclosure may be provided instead by storage devices in a Storage Area Network (SAN)) and/or other types of rack devices while remaining within the scope of the present disclosure. Alternatively, in some embodiments, the mesh client device of the present disclosure may be provided instead by other computing devices (e.g., cell phones, laptops) that may change locations and are not placed in a rack while remaining within the scope of the present disclosure.

In the specific embodiment illustrated in FIG. 4, the networking device 400 includes a chassis 402 having a top surface 402a, a bottom surface 402b that is located opposite the chassis 402 from the top surface 402a, a front surface 402c extending between the top surface 402a and the bottom surface 402b, a rear surface 402d located opposite the chassis 402 from the front surface 402c and extending between the top surface 402a and the bottom surface 402b, and a pair of side surfaces 402e and 402f located opposite the chassis 402 from each other and extending between the top surface 402a, the bottom surface 402b, the front surface 402c, and the rear surface 402d. While not illustrated, each of the side surfaces 402e and 402f (as well as other surfaces) on the networking device 400 may include rack coupling features for engaging the device coupling features 208 on the rack 200 to couple the networking device 400 to the rack 200.

In the embodiments discussed below, the front surface 402c of the networking device 400 includes an antenna system 404 that extends from the front surface 402c at a location that is adjacent the side surface 402e. In the illustrated embodiment, the antenna system 404 includes a pair of antennas (e.g., antennas 404a and 404b). However, different numbers of antennas (e.g., a single antenna, more than two antennas, etc.) will fall within the scope of the present disclosure. In a specific example, the antennas 404a and 404b in the antenna system 404 may be provided by transmitters and/or receivers (e.g., the antenna 404a in the antenna system 404 may be provided as a transmitter, while the antenna 404b in that antenna system 404 may be provided as a receiver). While the antennas 404a and 404b in the antenna system 404 are illustrated with straight lines, one of skill in the art in possession of the present disclosure will recognize that antenna(s) used in antenna systems may include a three-dimensional shape/configuration that provides a width and height (as well as the length that is illustrated). For example, the antennas 404a and 404b used for the antenna system 404 may include a width of approximately 5 millimeters and a height of approximately 1-2 millimeters. In some embodiments, it may be desirable to minimize the width of antennas to ensure that no interference is introduced between adjacent antennas. In some embodiments, the antennas 404a and 404b in the antenna system 404 may reside inside and/or otherwise be housed in the chassis 402, and thus may not extend outwards from the surfaces (e.g., the top surface 402a, the bottom surface 402b, the front surface 402c, the rear surface 402d, and/or the side surfaces 402e and 402f) of the chassis 402.

In the embodiments discussed below, the antennas 404a and 404b for the antenna system 404 are configured to be coupled to and decoupled from the networking device 400. For example, the antennas 404a and 404b for the antenna system 404 may be transmitters/receivers that are configured to couple to data communications ports (e.g., dual-Ethernet ports, dual USB networked ports, dual PCIe networked ports, or other data communications ports known in the art) on the networking device 400. In some embodiments, the antennas 404a and 404b for the antenna system 404 may be coupled to conventional dual Ethernet ports on a structurally conventional server device to provide the wireless communication functionality discussed below. However, in other embodiments, the networking device 400 may be configured with Ethernet ports according to the teachings below in order to provide the wireless communication functionality discussed below. Furthermore, in other embodiments, each of the antennas 404a and 404b in the antenna system 404 may be an integrated component of the networking device 400 such that it is not configured to be removed from the front surface 402c of the chassis 402. Thus, one of skill in the art in possession of the present disclosure will recognize that the provisioning of antennas 404a and 404b on the networking device 400 to provide the wireless communication functionality discussed below will depend on the configuration of the system (i.e., the racks, the devices in the racks, etc.), and a wide variety of different antenna systems (integrated, port-coupled, combinations thereof, etc.) will fall within the scope of the present disclosure.

In some embodiments, the networking device 400 may include a wireless communication system that is coupled to the antenna system 404 and that is configured to receive wireless communications via the antenna system 404. For example, the wireless communication system may be provided to use a wireless protocol such as ultra-wideband (UWB) wireless communications, OFDM wireless communications, WirelessHART® wireless communications, ZigBee® wireless communications, Bluetooth® wireless communications, 6LoWPAN® wireless communications, Wi-Fi® wireless communications, or any other wireless protocol known in the art. However, one of skill in the art in possession of the present disclosure will recognize that other wireless communication protocols will fall within the scope of the present disclosure. Alternatively, the server device 400 may include Ethernet ports that may be connected to Ethernet cables to provide communications between the server device 400 and a networking device (e.g., a networking device 300 positioned in the same rack).

While in the embodiments discussed below, the server device 400 is provided as a mesh client device that connects to the wireless mesh network of the present disclosure while positioned in a device housing in the rack 200, other mesh client devices may be provided in place of the server device 400 while remaining within the scope of the present disclosure. For example, storage devices, cell phones, laptops, chassis controller cards or line cards of a chassis system, and/or other networking devices may be enabled to function as a mesh client device and may be positioned at other locations while remaining within the scope of the present disclosure. As such, the mesh client device(s) of the present disclosure may be positioned on the rack 200 (e.g., on the top surface 202*a*), adjacent the rack 200 (e.g., on a wall, ceiling, or floor adjacent the rack 200), in a location without using a rack 200, and/or in a variety of other locations that would allow for the wireless mesh network and communication paths discussed below and that would be apparent to one of the skill in the art in possession of the present disclosure.

Referring now to FIGS. 5A and 5B, an embodiment of a wireless mesh network 500 is illustrated. As illustrated in the specific embodiment of FIG. 5A, eight racks 200-1 to 200-8 that may each be the rack 200 illustrated in FIG. 2 are provided in rows A, B, and C in a data center. Networking devices 300-1 to 300-8 that may each be the networking device 300 illustrated in FIGS. 3A and 3B are positioned in the first device housing 210*a* defined by the rack base 202 of each rack 200-1 to 200-8. A plurality of server devices 400 that may each be the server device 400 illustrated in FIG. 4 are positioned in one or more of the second device housings 210*b* of each rack 200-1 to 200-8. While the networking devices 300 are illustrated and described below as utilized as the nodes that provide the wireless mesh network, in some embodiments, the nodes that provide the wireless mesh network may be separate from the networking devices 300 and/or used in combination with the networking devices 300 while being positioned on top of the racks, underneath the racks, on the ceiling of the datacenter, on or under the floor of the datacenter, and/or in any other location suitable for providing the wireless mesh network.

Referring now to FIG. 5B, a top view of the networking devices 300-1 to 300-8 (also referred to herein as nodes) that are positioned in the racks 200-1 to 200-8 illustrated in FIG. 5A to provide the wireless mesh network 500 are illustrated. Each node has a corresponding wireless communication range (illustrated by dashed circled in the illustrated embodiment), and may directly wirelessly communicate with any other node within its wireless communication range (also referred to below as in-range nodes). In the particular embodiment of FIG. 5B, the wireless communication ranges 300-1A and 300-7A of the nodes 300-1 and 300-7, respectively, (which are the only wireless communication ranges illustrated in FIG. 5B for clarity) cover a plurality of neighboring nodes to allow the node 300-1 and 300-7 to communicate directly with each of the neighboring nodes in its wireless communication range. For example, node 300-1 has the wireless communication range 300-1A, and may communicate with all the nodes within the wireless communication range 300-1A (e.g., nodes 300-2 and 300-4). Similarly, node 300-7 has a wireless communication range 300-7A, and may communicate directly with all the nodes with the wireless communication range 300-7A (e.g., nodes 300-4, 300-5, 300-6, and 300-8).

In some embodiments, no direct link may exist between two particular nodes, and data sent between those particular nodes may be routed through other nodes using one or more paths that have multiple hops (i.e., data may hop each time it is relayed through a node, and a latency may be related to the number of hops required to complete a transmission.) In the specific embodiment illustrated in FIG. 5B, no direct link exists between nodes 300-1 and 300-7, and data sent between nodes 300-1 and 300-7 may be routed through other nodes using one or more paths that include multiple hops. For example, data from node 300-1 to 300-7 may use a first path of two hops when transmitted from node 300-1 to node 300-4, and then transmitted from node 300-4 to node 300-8, where the node 300-4 is within the wireless communication ranges 300-1A and 300-7A of both nodes 300-1 and 300-7. Alternatively or additionally, data transmitted from node 300-1 to 300-7 may use another path of three hops by being transmitted from node 300-1 to node 300-2, then being transmitted from node 300-2 to node 300-5, and then being transmitted from node 300-5 to node 300-7. The redundancy of the available paths between nodes may be used by the wireless mesh network 500 to recover from path interruptions when one or more nodes change wireless communication characteristics and other nodes are available to provide wireless communication ranges that overlap that coverage area.

Figure 6:
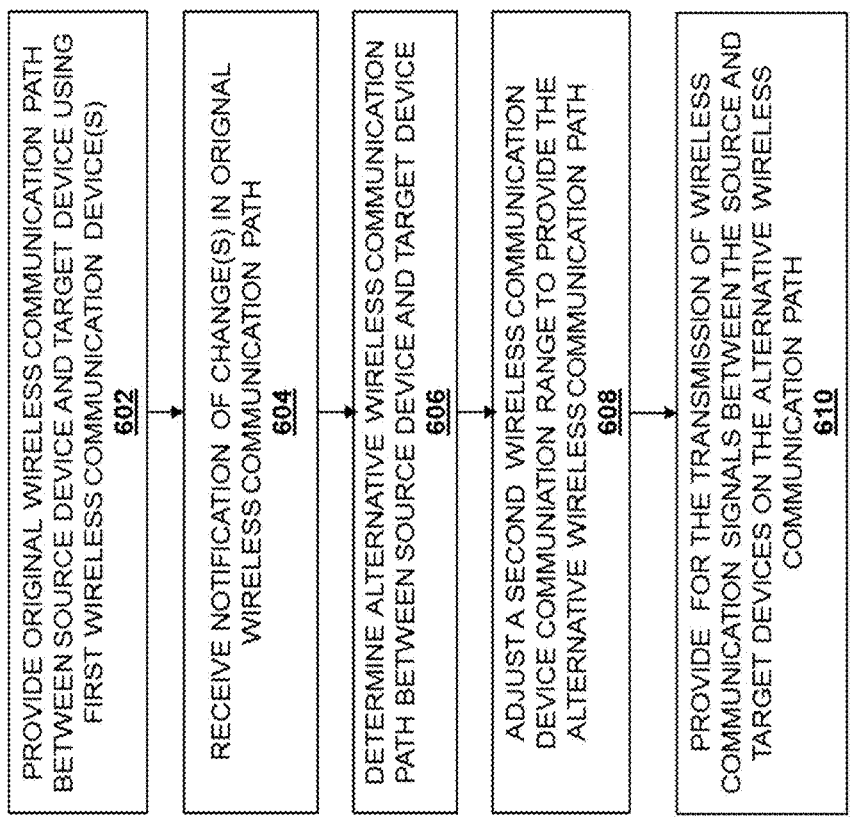
FIG. 6 is a flow chart illustrating an embodiment of a method for repairing gaps in wireless communication paths in a wireless mesh network.

Referring now to FIG. 6, an embodiment of a method 600 for repairing a wireless mesh network is illustrated. The embodiments of the method 600 are discussed below with reference to FIGS. 7A-11B, which provide examples of the networking devices 300 of FIGS. 3A and 3B and server devices 400 of FIG. 4 operating in a wireless mesh network according to the method 600. The method 600 provides for the proactive repair of gaps in wireless communication paths in a wireless mesh network caused by a change in wireless communication properties of the wireless communication system in any particular networking device 300 that is used as a node to provide the wireless mesh network. This is accomplished, at least in part, by detecting or predicting a change in an original wireless communication path and determining gap(s) resulting from that change, generating a change notification message including information about possible alternative paths that may provide for the repair of the gap(s), and sending the change notification message to other nodes in the wireless mesh network. Other networking devices 300 receiving the change notification message may use the change notification to determine whether they can operate to help provide the alternative wireless communication paths, and adjust their wireless communication ranges to help provide those alternative wireless communication paths. However, one of skill in the art in possession of the present disclosure will recognize that a wide variety of modification to the embodiments discussed below (different configurations of the networking devices 300 and the wireless mesh network, and other networking device(s) performing the method 600, etc.) will fall with the scope of the present disclosure.

Figure 7A:
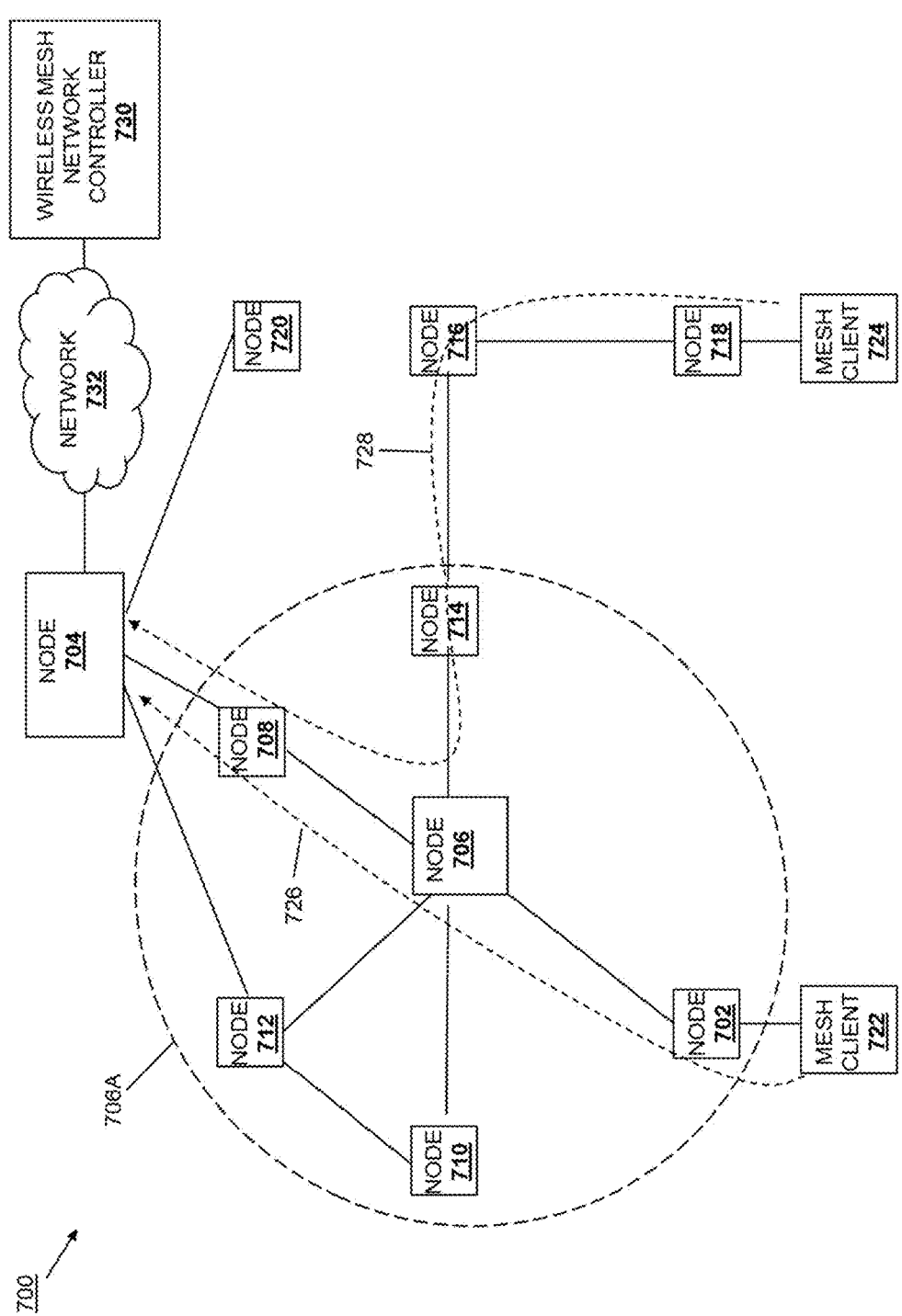
FIG. 7A is a schematic view illustrating an embodiment of communications between networking devices in a wireless mesh network operating according to the method of FIG. 6.

The method 600 begins at block 602, where an original wireless communication path is provided between a source device and a target device using first wireless communication device(s). Referring now to FIG. 7A, in an embodiment of block 602, a wireless mesh network 700 is provided that is substantially similar to the wireless mesh network 500 illustrated in FIG. 5. In the present embodiment, the nodes 702-720 of the wireless mesh network 700 may be the networking device 300 illustrated and described with reference to FIGS. 3a and 3b, and the mesh clients 722 and 724 may be the server devices 400 illustrated and described with reference to FIG. 4. In some embodiments, the wireless mesh network 700 may be connected to a wireless mesh network controller 730 through a network 732. In some embodiments, the wireless mesh network controller 730 may be one of the networking devices 300 illustrated and described with reference to FIGS. 3a and 3b.

As illustrated in FIG. 7A, an original wireless communication path 726 may be provided between a mesh client 722 (also referred to below as a source device 722) and a node 704 (also referred to below as a target device 704) via the node 706. For example, data may be wirelessly transmitted from the source device 722 to node 702, from node 702 to node 706, from node 706 to node 708, and then from node 708 to the target device 704. Similarly, an original wireless communication path 728 may be provided between a mesh client 724 (also referred to below as a source device 724) and the node 704 via the node 706. For example, data may be wirelessly transmitted from the source device 724 to node 718, from node 718 to node 716, from node 716 to node 714, from node 714 to node 706, from node 706 to node 708, and then from node 708 to the target device 704. As illustrated in FIG. 7A, node 706 may include a wireless communication range 706A and, as such, may directly wirelessly communicate with all the nodes within the wireless communication range 706A (e.g., nodes 702, 708, 710, 712, and 714, also referred to as original one-hop neighbors of node 706) in providing the original wireless communication paths 726 and 728.

Figure 7B:
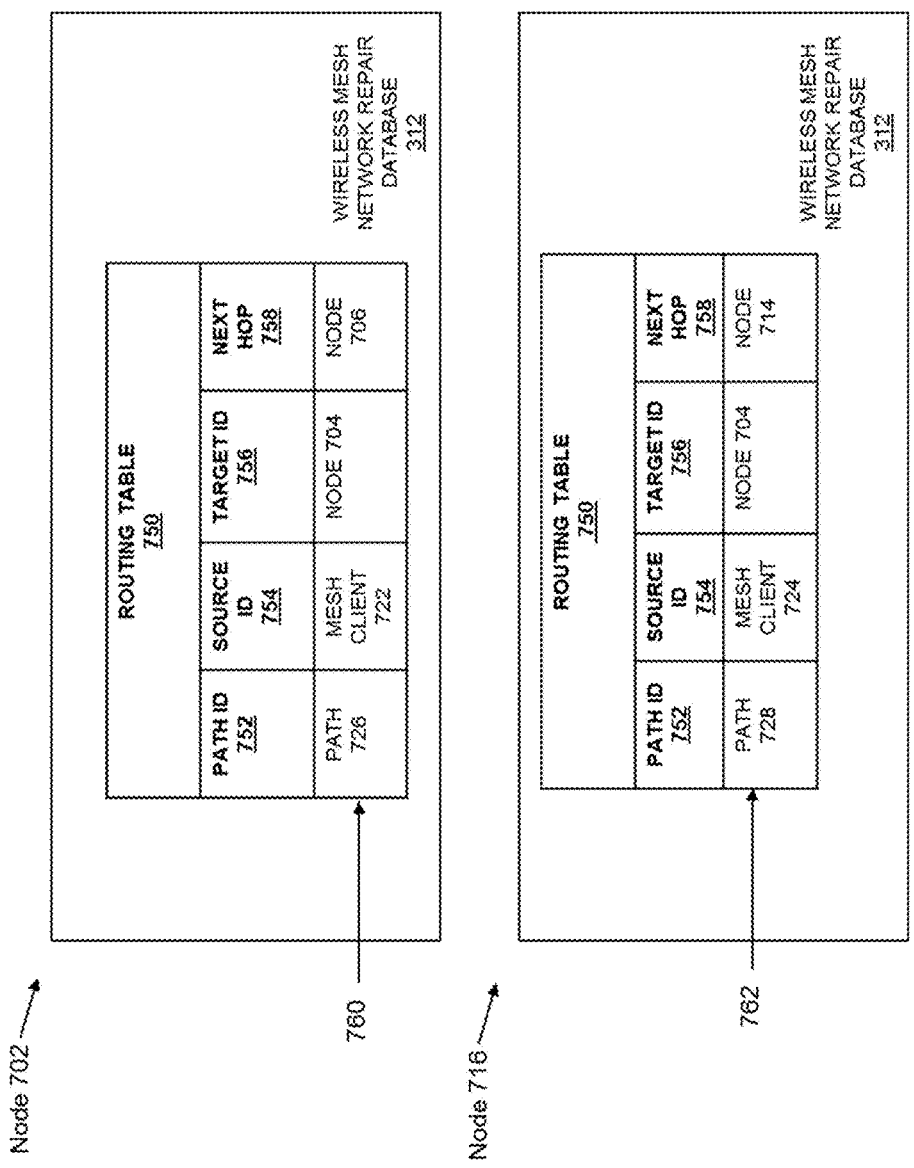
FIG. 7B is a schematic view illustrating an embodiment of a wireless mesh network repair database used in a networking device operating according to the method of FIG. 6.

Referring now to FIG. 7B, the wireless mesh network repair engine 308 in the nodes that provide the original wireless communication paths 726 and 728 may store path information about those original wireless communication paths between the source device and target device in the wireless mesh network repair database 312. For example, path information 760 may be stored in a routing table 750 in the wireless mesh network repair database 312 of the node 702 that provides the original wireless communication path 726. In the illustrated embodiment, the routing table 750 has columns that provide a path identifier field 752, a source identifier field 754, a target identifier field 756, and a next hop field 758 for any of a plurality of rows in the routing table 750. Each row in the routing table 750 may be populated with information for a communication path used to transmit data between a source device and a target device by the wireless mesh network repair engine 308. In the embodiment illustrated in FIG. 7B, the path information 760 includes an identifier ("PATH 726") for the original wireless communication path 726 in the path identifier field 752, an identifier ("MESH CLIENT 722") for the source device 722 in the source identifier field 754, an identifier ("NODE 704") for the target device 704 in the target identifier field 756, and an identifier ("NODE 706") for the next hop after the node 702 in the next hop 758 field. Similarly, path information 762 may be populated in a corresponding row in a routing table 750 in the wireless mesh network repair database 312 of node 716 that provides the original wireless communication path 728. The corresponding row includes an identifier ("PATH 728") for the original wireless communication path 728 in the path identifier field 752, an identifier ("NODE 718") for the source device 718 in the source identifier field 754, an identifier ("NODE 704") for the target device 704 in the target identifier field 756, and an identifier ("NODE 714") for the next hop after the node 714 in the next hope field 758.

One of skill in the art in possession of the present disclosure will recognize that similarly routing tables may be provided in each of the nodes in the wireless mesh repair system, and those routing tables may be modified depending on the characteristics of the wireless mesh network system. For example, in some embodiments, fields may be added to the routing tables that identify the cost of the path, access control lists, forwarding paths, one or more next hops in the path, path weights, path priorities, link or flow aggregation groups, redundant path protection, path operational status, and/or other routing information known in the art. As such, a wide variety of information other than that which is illustrated may be provided as path information included in a row of the routing table 750 while remaining within the scope of the present disclosure.

Figure 8A:
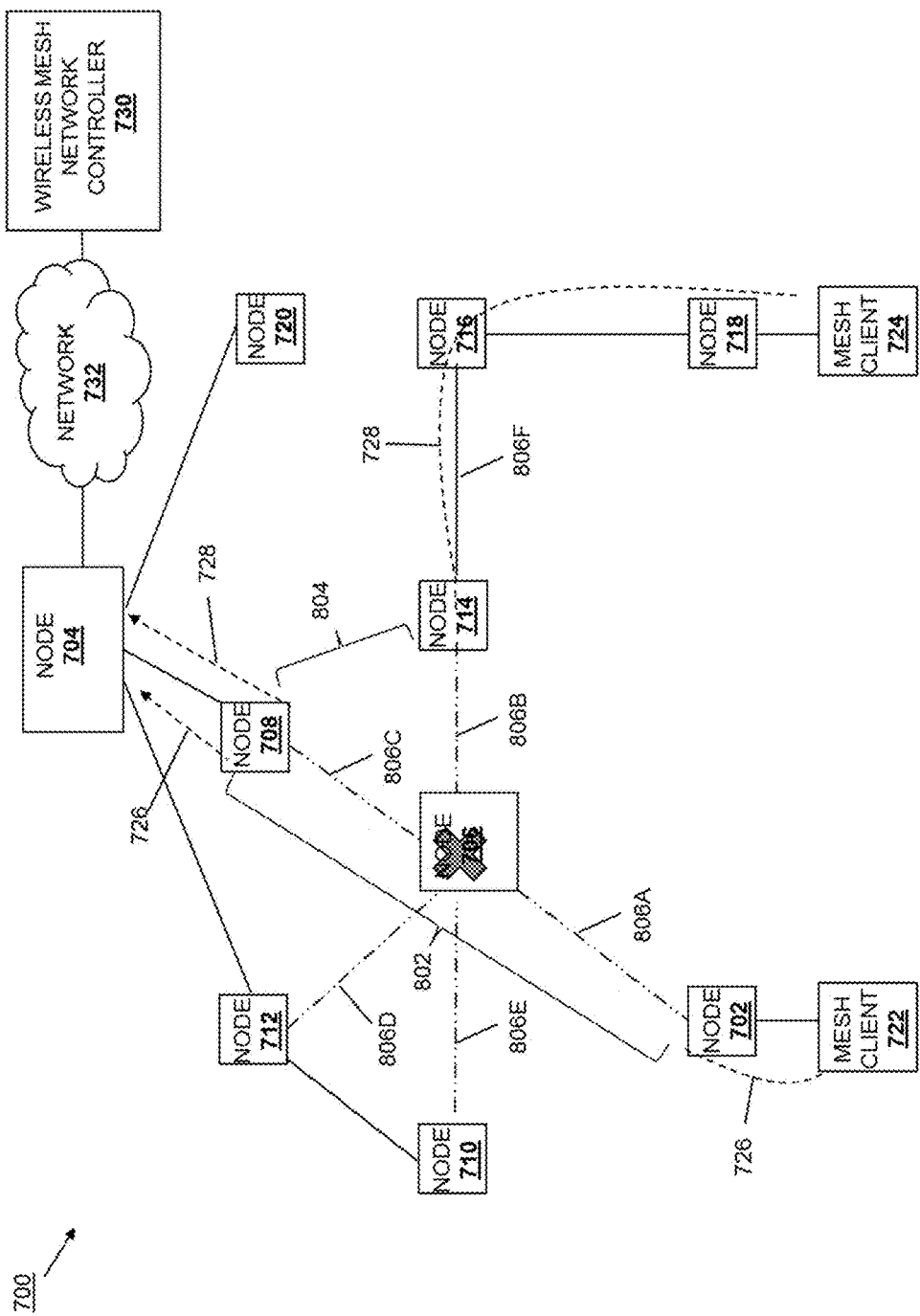
FIG. 8A is a schematic view illustrating an embodiment of communications between networking devices in a wireless mesh network operating according to the method of FIG. 6.

The method 600 then proceeds to block 604, where a notification of change(s) in the original wireless communication path is received. Referring to FIG. 8A, in some embodiments, the wireless mesh network repair engine 308 in the node 706 may detect and/or predict a change in wireless communication properties of the wireless communication system 310 in the node 706 before those change(s) happens. Such change(s) in the wireless communication properties may affect the wireless communication range of the node 706, and result in "gaps" in the original wireless communication paths 726 and 728 (e.g., breaks in the node-to-node communications that previously provided the original wireless communication path). In some embodiments, the wireless mesh network repair engine 308 may be configured to utilize the information associated with the change(s) in wireless communication properties to determine results and/or consequences of those change(s) that may result in gaps in the original wireless communication paths 726 and 728. In the embodiment illustrated in FIG. 8A, the node 706 is experiencing (or is about to experience) a change (e.g., a power failure, a shutdown, a reboot, etc.) that may cause the node 706 to have a smaller (or no) wireless communication range coverage such that all direct paths (e.g., paths 806A-E) between the node 706 and its original one-hop neighbors (e.g., nodes 702, 708, 710, 712, and 714) are no longer available. Alternatively, in some embodiments, the node 706 may be preparing a change (e.g., reducing a wireless transmission power to reduce interference, provide more secure wireless communications, etc.) which may cause the node 706 to have a smaller wireless communication range coverage such that some direct paths (e.g., paths 806A and 806B) between the node 706 and its original one-hop neighbors (e.g., nodes 702 and 714) may become unavailable, while other direct paths (e.g., paths 806C, 806D, and 806E) between the node 706 and its original one-hop neighbors (e.g., nodes 708, 710, and 712) may remain available. In the embodiment illustrated in FIG. 8A, the wireless mesh network repair engine 308 in the node 706 may determine that the changes in wireless communication properties (i.e., power failure, temporary power loss, temporary inability to wirelessly communication, transmission power adjustments, radio reallocation, radio protocol change, channel frequency change, etc.) will result in the loss of paths 806A and 806C in the original wireless communication path 726, and the loss of those paths may cause a gap 802 (i.e., such that the nodes 702 and 708 can no longer communicate through the node 706), while the loss of paths 806B and 806C in the original wireless communication path 728 may cause a gap 804 (i.e., such that the nodes 708 and 714 can no longer communicate through the node 706).

Figure 8B:
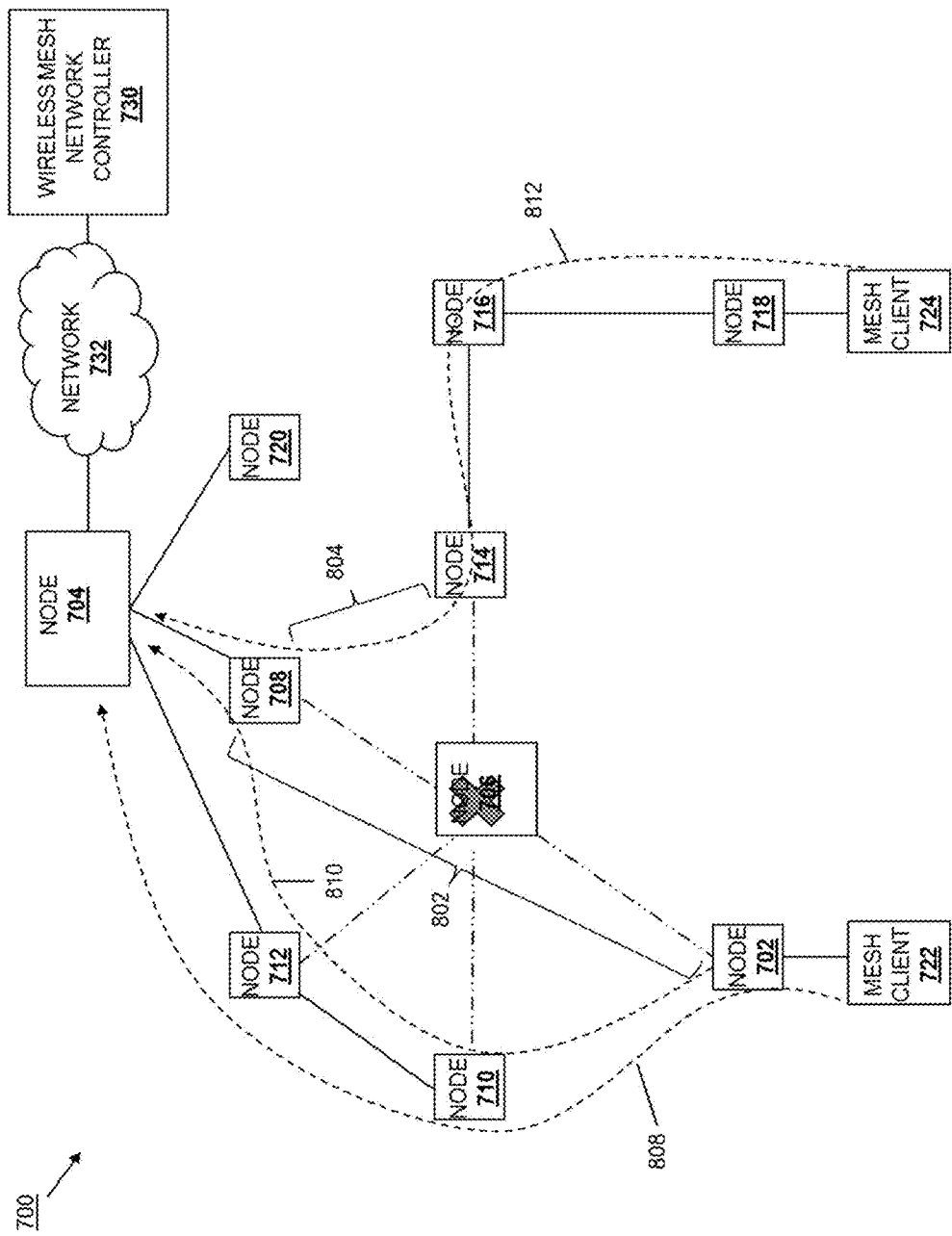
FIG. 8B is a schematic view illustrating an embodiment of communications between networking devices in a wireless mesh network operating according to the method of FIG. 6.

Referring now to FIG. 8B, in some embodiments, the wireless mesh network repair engine 308 in the node 706 may utilize the information associated with the change in wireless communication properties to determine possible paths that may be used to repair gaps caused by the change. In one embodiment, the wireless mesh network repair engine 308 in the node 706 may identify a first possible path 808 to repair the gap 802 in the original wireless communication path 726. For example, the first possible path 808 provides for the wireless transmission of data from the source device 722 to node 702, from node 702 to node 710, from node 710 to node 712, and then from node 712 to target device 704. In another embodiment, the wireless mesh network repair engine 308 in the node 706 may further identify a second possible path 810 to repair the gap 802 in the original path 726. For example, the second possible path 810 provides for the wireless transmission of data from the source device 722 to node 702, from node 702 to node 710, from node 710 to node 712, from node 712 to node 708, and then from node 708 to target device 704. In another embodiment, the wireless mesh network repair engine 308 in the node 706 may identify a third possible path 812 to repair the gap in the original path 728. For example, the third possible path 812 may provide for the wireless transmission of data from the source device 724 to node 718, from node 718 to node 716, from node 716 to node 714, from node 714 to node 708, and then from node 708 to target device 704. While three possible paths have been illustrated and described, one of skill in the art in possession of the present disclosure will recognize that any number of possible paths may be determined by the wireless mesh network repair engines in the nodes while remaining within the scope of the present disclosure.

Referring now to FIG. 8C, the wireless mesh network repair engine 308 in the node 706 may generate a change notification message 850 including information about the change in node 706. In the illustrated embodiment, the change notification message 850 includes a changing node identifier 852 ("NODE 706") identifying the node 706 that is experiencing the change. In the illustrated embodiment, the change notification message 850 also includes possible path information 856 that details the possible paths that may be used to repair the gaps in the original wireless communication paths. For example, as illustrated in FIG. 8C, the possible path information 856 includes two possible paths ("PATH 808" and "PATH 810") to repair an original wireless communication path ("PATH 726"), as well as a possible path ("PATH 812") to repair the original wireless communication path ("PATH 728").

In the illustrated embodiment, the change notification message 850 also includes node information 854 that may include various communication properties (e.g. absolute location, relative location to another one-hop neighbor, communication frequency channel, communication direction, communication protocol, and/or other communication property known in the art) of other nodes in the wireless mesh network 700 (e.g., shared by the nodes in the wireless mesh network). In the example illustrated in FIG. 8C, the node information 854 includes the communication properties for node 706's one-hop neighbors ("C1" for "NODE 702," "C2" for "NODE 708," "C3" for "NODE 710," "C4" for "NODE 712," and "C5" for "NODE 714). Alternatively, in some embodiments, the possible path information 856 may include node information 854 for particular nodes used by the possible paths. As such the change notification message 850 may include a variety of information determined by and/or available to the node that is experiencing the change in its wireless communication properties and, as discussed below, that information may provide the other nodes the ability to adjust their operation to compensate for that change.

Figure 8D:
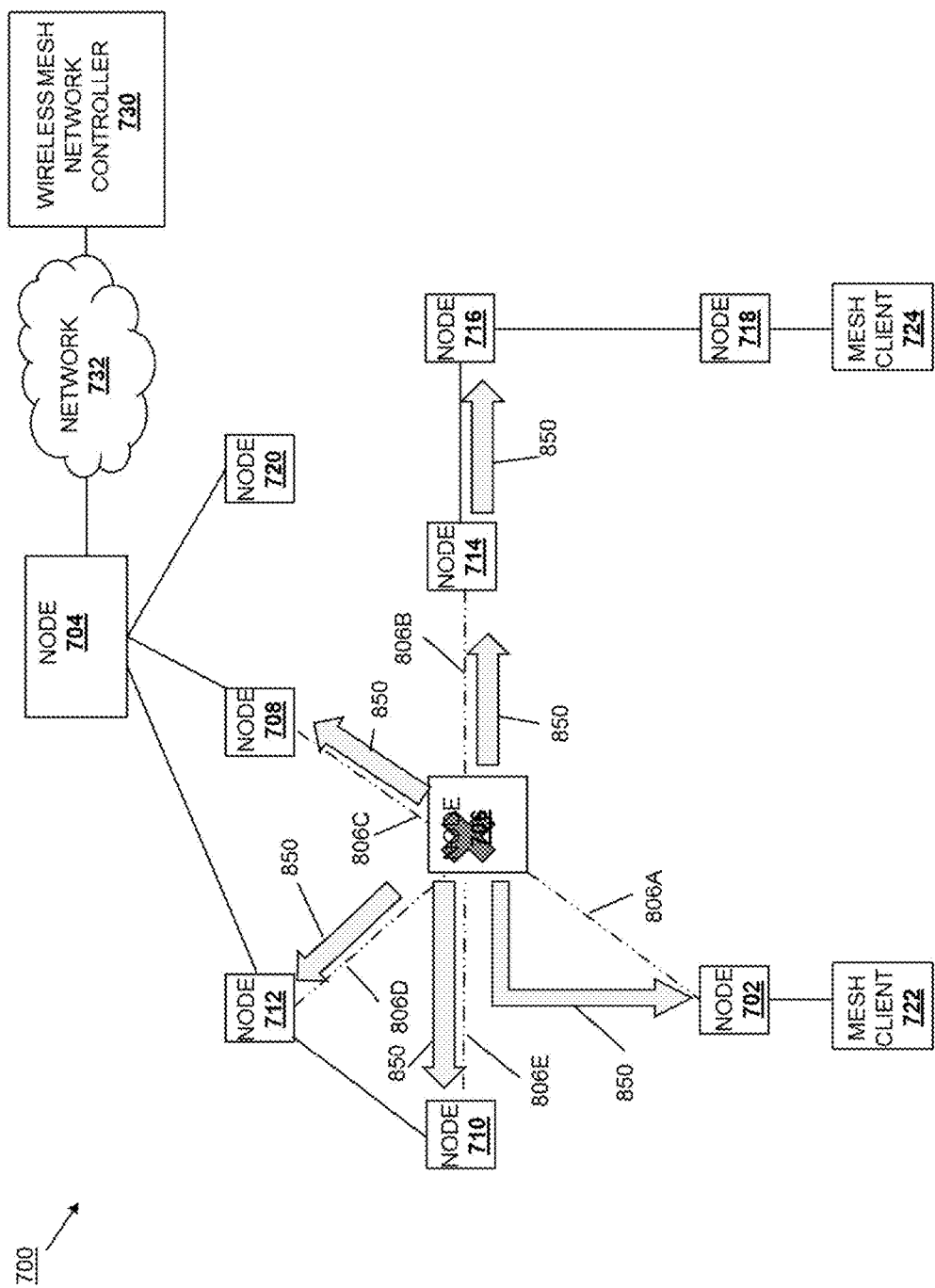
FIG. 8D is a schematic view illustrating an embodiment of communications between networking devices in a wireless mesh network operating according to the method of FIG. 6.

Referring to FIG. 8D, the wireless mesh network repair engine 308 in the node 706 may send the change notification message 850 (e.g., using the antenna systems 304 and/or 314) to other nodes in the wireless mesh network 700. As illustrated in FIG. 8D, in the present embodiment, the change notification message 850 may be sent to the original one-hop neighbors (nodes 702, 708, 710, 712, and 714) of node 706 using the paths 806A-E. In some embodiments (e.g., when the node 706 is about to experience a power failure), the sending of the change notification message 850 may be provided as a "dying gasp" message that may be enabled by some power storage subsystem (e.g., a capacitor, battery, etc.) in the node 706 that provides an amount of power to the node 706 that allows the change notification message 850 to be sent. The wireless mesh network repair engines 308 in the nodes 702, 708, 710, 712, and 714 may receive the change notification message 850 using their respective antenna systems 304 and/or 314.

In some embodiments, the wireless mesh network repair engine 308 in the original one-hop neighbors of the node 706 may forward the change notification message 850 to other nodes in the wireless mesh network 700 such that the change notification messages 850 may be propagated through the wireless mesh network 700. For example, as illustrated in FIG. 8D, the wireless mesh network repair engine 308 in node 714 may forward the change notification message 850 to node 716. Similarly, the change notification messages 850 may be propagated further through the wireless mesh network and to the wireless mesh network controller 730 (e.g., using a path including node 708, node 704, and network 732).

Alternatively, in some embodiments, the wireless mesh network repair engine 308 in the node may monitor the wireless mesh network 700 (e.g., by snooping/sniffing packets or using other monitoring techniques known in the art) to predict a change in wireless communication properties of the wireless communication system 310 in the node 706. For example, the wireless mesh network repair engine 308 in node 708 may detect a prepare-to-change message (e.g., an instruction from the wireless mesh network controller 730 to the node 706 to reboot, reduce wireless transmission power, etc.) requesting a change in wireless communication properties of the wireless communication system 310 in the node 706. The wireless mesh network repair engine 308 in node 708 may utilize the information associated with the change included in the prepare-to-change message to determine results and/or consequences of that change that may result in gaps in the original wireless communication paths 726 and 728, and determine possible paths to repair gaps that may be caused by the change substantially as described above. In some embodiments, the wireless mesh network repair engine 308 in node 708 may generate a change notification message 850 similarly as discussed above, and may send that change notification message 850 to other nodes in the wireless mesh network 700 and/or other devices (e.g., wireless mesh network controller 730) through the network 732.

Referring back to FIGS. 6 and 9, the method 600 then proceeds to block 606, where an alternative wireless communication path between the source device and the target device is determined utilizing the change notification message. Referring now to FIG. 9, the wireless mesh network repair engine 308 in one or more nodes may utilize the information in the change notification message 850 received from the node 706 (or other nodes) to determine alternative paths for the original wireless communication paths 726 and 728. In one embodiment, the wireless mesh network repair engine 308 in node 702 may choose an alternative path from the two possible paths 808 and 810 for the original path 726 identified in the possible path information 856 of the change notification message 850, as discussed above with reference to FIGS. 8B and 8C. For example, as illustrated in FIG. 9, the wireless mesh network repair engine 308 in node 702 may determines an alternative path 902 between the source device 722 and the target device 704, where the alternative path 902 is the same as the possible path 808. In another example, the alternative path 902 for the original path 726 may include at least a portion of the possible path 808 or 810 identified by the possible path information 856 in the change notification message 850.

In some embodiments, the wireless mesh network repair engine 308 in node 702 may determine an alternative path for the original wireless communication path utilizing the node information 854 in the change notification message 850. For example, as illustrated in FIG. 9, the wireless mesh network repair engine 308 in node 702 may utilize the node information 854 to calculate the cost of possible paths and determine an alternative path 904 according to various wireless mesh network routing protocols (e.g., Zone Routing Protocol (ZRP), Fisheye State Routing protocol (FSR), and/or other routing protocol known in the art). The alternative path 904 may be a different path from the possible path 812 for the original path 728 identified in the change notification message 850.

In some embodiments, at block 606, the alternative paths may provide for the transmission of wireless communications between the source device and the target device. Alternatively, as illustrated in FIG. 9, in some embodiments the alternative paths 902 and 904 may include communication gaps 906 and 908, and may not provide for the transmission of wireless communications between the source device and the target device without some modification to the wireless communication properties of the nodes that are to be used to provide those alternative paths. For example, node 702 may have a wireless communication range 702A, and may communicate directly with all the devices within the wireless communication range 702A (e.g., with the node 706 and the mesh client 722). However, the wireless communication range 702A does not allow the node 702 to communicate with the adjacent node 710 that is on the alternative path 902. Similarly, node 716 has a wireless communication range 716A, and may communicate directly with all the devices within the wireless communication range 716A (e.g., with the nodes 714 and 718). However, the wireless communication range 716A does not allow the node 716 does to communicate with the adjacent node 720 that is on the alternative path 904.

Figure 10:
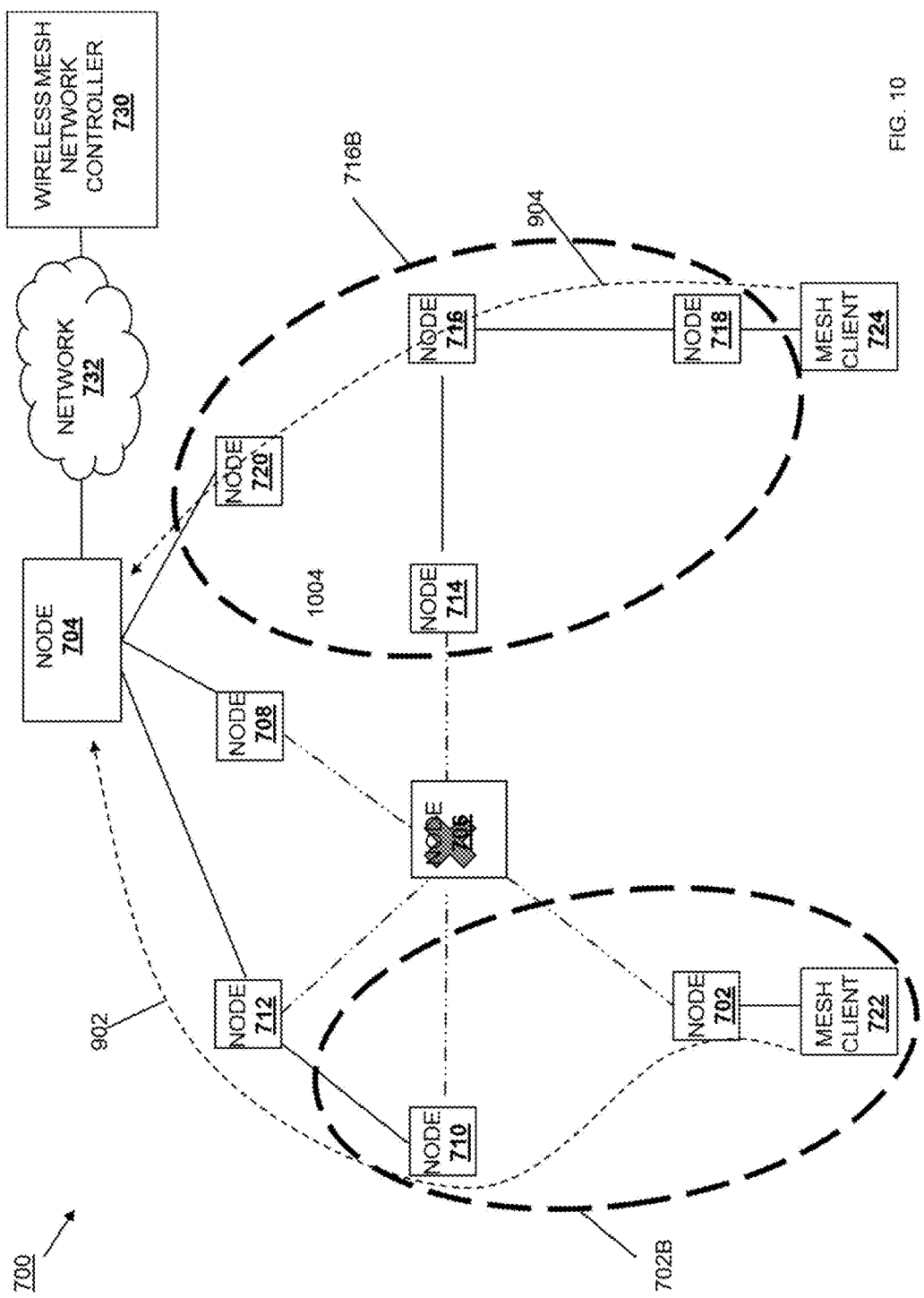
FIG. 10 is a schematic view illustrating an embodiment of communications between networking devices in a wireless mesh network operating according to the method of FIG. 6.

Referring now to FIGS. 6 and 10, the method 600 proceeds to block 608, where a wireless communication range of at least one device that is used to provide the alternative path is adjusted to provide the alternative path.

Referring now to FIG. 10, in some embodiments, the wireless mesh network repair engine 308 in nodes 702 and 716 may operate with their wireless communication systems 310 to adjust the wireless communication ranges of the nodes 702 and 716 to provide the alternative paths 902 and 904. For example, the wireless mesh network repair engine 308 in node 702 may analyze the received change notification message 850 to determine the alternative path, and then adjust the wireless communication range of the node 702 (e.g., by changing the wireless communication direction of the node 706 accordingly (e.g., using beam forming techniques) to the absolute or relative location of the node 710 provided in node information 854 in the received change notification message 850), so that the adjusted wireless communication range 702B of the node 702 allows the node 702 to communicate with the adjacent node 710 and the mesh client 222 to provide that portion of the alternative path 902. Similarly, the wireless mesh network repair engine 308 in node 716 may adjust the wireless communication range of the node 716 (e.g., by increasing the wireless transmission strength of the node 716 accordingly to reach the absolute or relative location of the node 720 provided in node information 854 in the received change notification message 850) so that the node 716 may have a wireless communication range 716B that allows the node 716 to communicate with adjacent nodes 718 and 720 to provide that portion of the alternative path 904.

As such, adjustments to nodes to provide the alternative paths may include changes in wireless transmission power (e.g., increases in power to reach a node that is not within an original wireless communication range), changes in wireless communication protocols (e.g., from a shorter range wireless communication protocol (e.g., Bluetooth) to a longer range wireless communication protocol (e.g., Wi-Fi) to reach a node that is not within an original wireless communication range), change in wireless communication frequency, changes in a wireless communication direction, and/or changes to a variety of other wireless communication properties that may operate to allow a node to provide a portion of the alternative paths discussed above. Furthermore, those adjustments may be based on any of the information communicated by the node experiencing the change or nodes learning about that change, and thus may be performed in response to received location coordinates for those nodes, received communication protocols utilized by those nodes, etc.

Figure 11A:
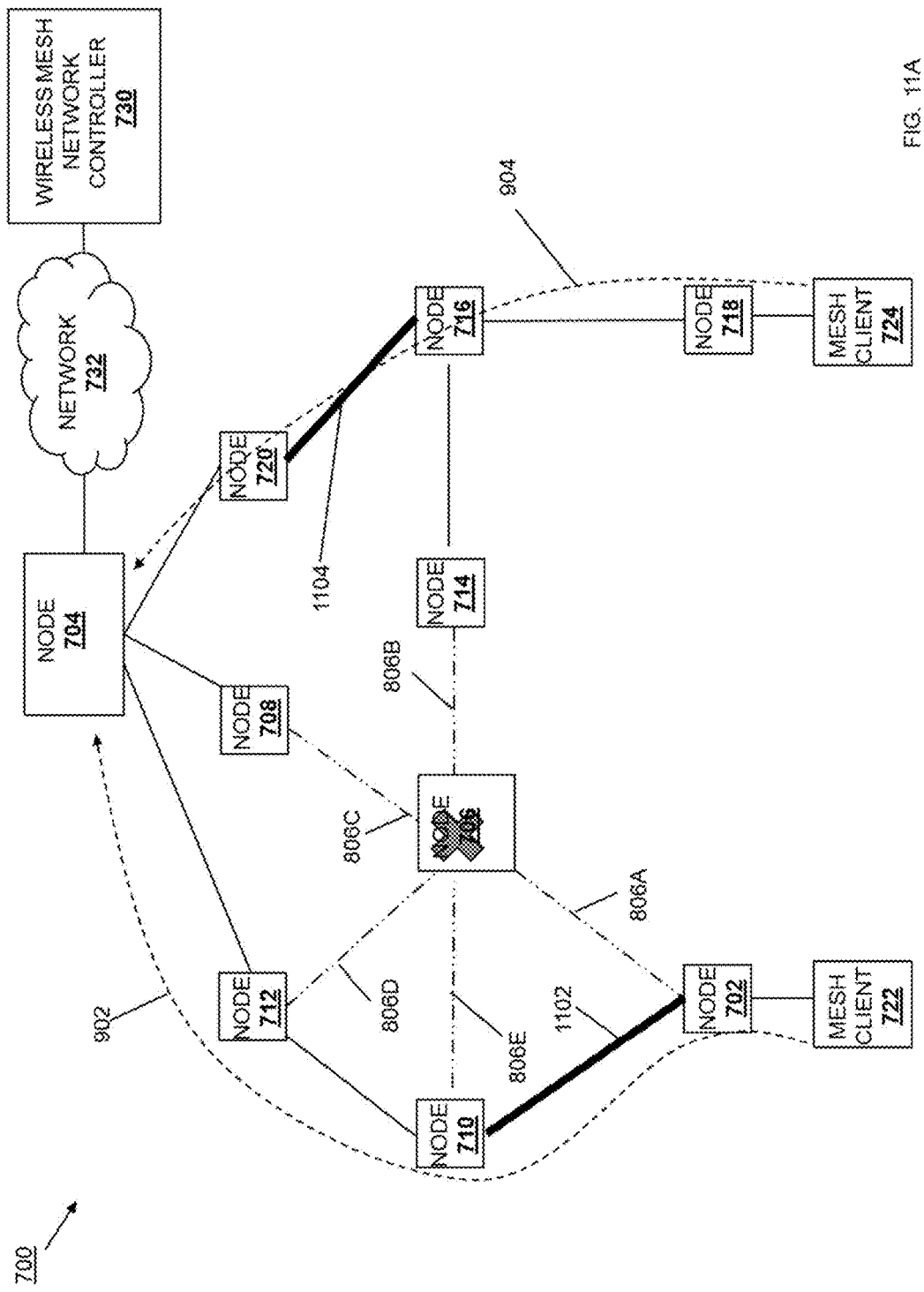
FIG. 11A is a schematic view illustrating an embodiment of communications between networking devices in a wireless mesh network operating according to the method of FIG. 6.
Figure 11B:
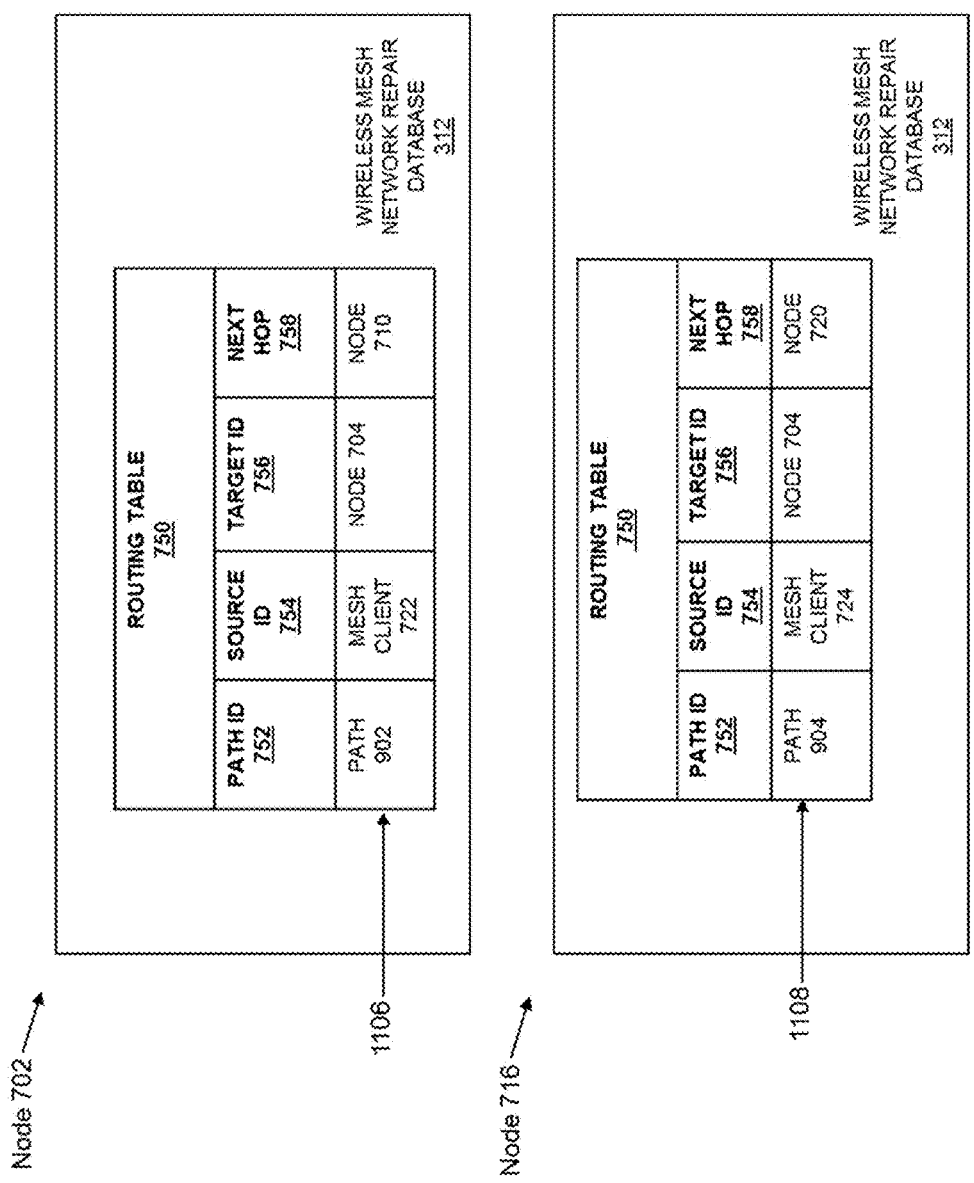
FIG. 11B is a schematic view illustrating an embodiment of a wireless mesh network repair database used in a networking device in a wireless mesh network operating according to the method of FIG. 6.

Referring now to FIGS. 6, 11A, and 11B, the method 600 then proceeds to block 610 where the transmission of wireless communication signals between the source device and the target device is provided on the alternative wireless communication path. Referring now to FIG. 11A, in the present embodiment, at block 610, the alternative path 902 does not include any communication gaps resulting from the change in the wireless communication properties in node 706, and may provide the transmission of wireless communication signals between the source device 722 and target device 704 (e.g. using a path 1102 between nodes 702 and 710 created at block 608). Similarly, at block 610, the alternative path 904 does not include any communication gaps resulting from the change in the wireless communication properties in node 706, and may provide the transmission of wireless communication signals between the source device 724 and target device 704 (e.g. using a path 1104 between nodes 716 and 720 created at block 608).

Referring now to FIG. 11B, the wireless mesh network repair engine 308 in the nodes (e.g., nodes 706 and 716) used by the original wireless communication paths 726 and 728 may update the path information between the source device and target device in the routing table 750 of their wireless mesh network repair databases 312. For example, a corresponding row for the original path 726 in the routing table 750 in the wireless mesh network repair database 312 of the node 702 may be replaced with path information 1106 that includes an identifier ("PATH 902") for the path 902 in the path identifier field 752, an identifier ("MESH CLIENT 722") for the source device 722 in the source identifier field 754, an identifier ("NODE 704") for the target device 704 in the target identifier field 756, and an identifier ("NODE 710") for the next hop after the node 702 in the next hop field 758. Similarly, the corresponding row for the original wireless communication path 728 in the routing table 750 in the wireless mesh network repair database 312 of the node 716 may be replaced with path information 1108 that includes an identifier ("PATH 904") for the path 904 in the path identifier field 752, an identifier ("MESH CLIENT 724") for the source device 724 in the source identifier field 754, an identifier ("NODE 704") for the target device 704 in the target identifier field 756, and an identifier ("NODE 720") for the next hop after the node 716 in the next hop field 758.

As illustrated in FIGS. 11A and 11B, at block 610 the transmission of wireless communication signals between the source device 722 and target device 704 may be provided on the alternative path 902 (e.g., by utilizing the routing tables 750 of the wireless mesh network repair databases 312 in the nodes that provide the alternative path 902). Similarly, the transmission of wireless communication signals between the source device 724 and target device 704 may be provided on the alternative path 904 (e.g., by utilizing the routing tables 750 of the wireless mesh network repair databases 312 in the node that provide the alternative path 902). The transmission of wireless communication signals may be provided on the alternative paths 902 and 904 immediately after paths 806A-806E become unavailable (or following some time period after the alternative paths 902 and 904 become available) due to the change in the node 706, which may increase the wireless mesh network redundancy and avoid latency and major packet loss.

While the wireless mesh repair engines 308 and wireless mesh network repair databases 312 have been described as being located in the nodes 702, 706, and 716, one of skill in the art will recognize that additionally or alternatively, the wireless mesh repair engines 308 and/or wireless mesh network repair databases 312 may be located in or coupled to a wireless mesh network controller 730 by the network 732 without departing from the scope of the present disclosure.

Thus, systems and methods have been described that provide for a timely and bandwidth efficient techniques for working around gaps introduced in a wireless mesh network. This is accomplished by detecting or predicting a change in an original wireless communication path and determining gap(s) resulting from that change. A change notification message including information about possible alternative paths that may provide for the repair of the gap(s) may be generated and sent to nodes in the wireless mesh network. Those nodes may determine alternative wireless communication paths according to the change notification message, and adjust their wireless communication ranges to help provide those alternative wireless communication paths.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A wireless mesh network repair system, comprising:
a first wireless communication device that is configured to:
provide a first wireless communication path that provides for a transmission of wireless communications between a source device and a target device; and
provide a notification of a change in the first wireless communication path that will prevent the transmission of wireless communications between the source device and the target device on the first wireless communication path;
at least one second wireless communication device that is configured to:
receive the notification from the first wireless communication device, and in response, determine a second wireless communication path that will provide for the transmission of wireless communications between the source device and the target device;
determine that a communication gap exists in the second wireless communication path and, in a response, adjust a second wireless communication device communication range to provide the second wireless communication path; and
provide for the transmission of wireless communications between the source device and the target device on the second wireless communication path.

2. The wireless mesh network repair system of claim 1, wherein the notification of the change in the first wireless communication path includes alternative wireless communication path information associated with at least one alternative wireless communication path that will provide for the transmission of wireless communications between the source device and the target device.

3. The wireless mesh network repair system of claim 2, wherein the alternative wireless communication path information includes locations of one or more wireless communication devices on the at least one alternative wireless communication path.

4. The wireless mesh network repair system of claim 2, wherein the second wireless communication path includes at least a portion of the alternative wireless communication path.

5. The wireless mesh network repair system of claim 2, wherein the second wireless communication path is a different wireless communication path than the alternative wireless communication path.

6. The wireless mesh network repair system of claim 1, wherein the second wireless communication device is configured to:
receive the notification provided by the first wireless communication device from a third wireless communication device.

7. The wireless mesh network repair system of claim 1, wherein the adjusting the second wireless communication device communication range to provide the second wireless communication path includes:
adjusting a wireless communication direction of the at least one second wireless communication device to provide the second wireless communication path.

8. An information handling system (IHS), comprising:
a wireless communication subsystem;
a processing system that is coupled to the wireless communication subsystem; and a memory system that is coupled to the processing system and that includes instructions that, when executed by the processing system, cause the processing system to provide a wireless mesh network repair engine that is configured to:
- receive a notification of a change in a first wireless communication path that will prevent a transmission of wireless communications between a source device and a target device on the first wireless communication path and, in response, determine a second wireless communication path that will provide for the transmission of wireless communications between the source device and the target device;
- determine that a communication gap exists in the second wireless communication path and, in response, adjust a first wireless communication device communication range to provide the second wireless communication path; and
- provide for the transmission of wireless communications between the source device and the target device on the second wireless communication path.

9. The IHS of claim 8, wherein the wireless mesh network repair engine is configured to:
- providing, by a second wireless communication device, the first wireless communication path that provides for the transmission of wireless communications between the source device and the target device; and
- determining the change in the first wireless communication path that will prevent the transmission of wireless communications between the source device and the target device on the first wireless communication path and, in response, providing the notification to wireless communication subsystem.

10. The IHS of claim 8, wherein the notification of the change in the first wireless communication path includes alternative wireless communication path information associated with at least one alternative wireless communication path that will provide for the transmission of wireless communications between the source device and the target device.

11. The IHS of claim 10, wherein the alternative wireless communication path information includes locations of one or more wireless communication devices on the at least one alternative wireless communication path.

12. The IHS of claim 10, wherein the second wireless communication path includes at least a portion of the alternative wireless communication path.

13. The IHS of claim 10, wherein the second wireless communication path is a different wireless communication path than the alternative wireless communication path.

14. The IHS of claim 8, wherein the adjusting the first wireless communication device communication range to provide the second wireless communication path includes:
- adjusting a communication direction of the at least wireless communication subsystem to provide the second wireless communication path.

15. A method for providing wireless mesh network repair, comprising:
- receiving, by a first wireless communication device, a notification of a change in a first wireless communication path that will prevent a transmission of wireless communications between a source device and a target device on the first wireless communication path and, in response, determining a second wireless communication path that will provide for the transmission of wireless communications between the source device and the target device;
- determining, by the first wireless communication device, that a communication gap exists in the second wireless communication path and, in response, adjusting communication range to provide the second wireless communication path; and
- providing, by the first wireless communication device, for the transmission of wireless communications between the source device and the target device on the second wireless communication path.

16. The method of claim 15, further comprising:
- providing, by a second wireless communication device, the first wireless communication path that provides for the transmission of wireless communications between the source device and the target device; and
- determining the change in the first wireless communication path that will prevent the transmission of wireless communications between the source device and the target device on the first wireless communication path and, in response, providing the notification to the first wireless communication device.

17. The method of claim 15, wherein the notification of the change in the first wireless communication path includes possible wireless communication path information associated with at least one possible wireless communication path that will provide for the transmission of wireless communications between the source device and the target device.

18. The method of claim 17, wherein the possible wireless communication path information includes locations of one or more wireless communication devices on the at least one possible wireless communication path.

19. The method of claim 17, wherein the second wireless communication path includes at least a portion of the possible wireless communication path.

20. The method of claim 15, wherein the adjusting the first wireless communication device communication range to provide the second wireless communication path includes:
- adjusting a communication direction of the first wireless communication device to provide the second wireless communication path.

* * * * *

UNITED STATES PATENT AND TRADEMARK OFFICE
CERTIFICATE OF CORRECTION

PATENT NO. : 9,986,471 B2
APPLICATION NO. : 14/943833
DATED : May 29, 2018
INVENTOR(S) : Christopher Stephen Petrick It is certified that error appears in the above-identified patent and that said Letters Patent is hereby corrected as shown below:

In the Claims

Column 21, Line 32 Claim 9, insert --the-- before "wireless"

Column 22, Line 17 Claim 15, insert --a first wireless communication device-- after "adjusting"

Signed and Sealed this
Twenty-sixth Day of March, 2019

Andrei Iancu
*Director of the United States Patent and Trademark Office*